United States Patent [19]

Iwata et al.

[11] Patent Number: 5,680,302
[45] Date of Patent: Oct. 21, 1997

[54] AC OUTPUT CONTROL APPARATUS

[75] Inventors: Keiji Iwata; Michihisa Murasato; Kenichi Tanigawa; Sadaharu Tamoto, all of Kawasaki, Japan

[73] Assignees: Nippon Steel Corporation, Tokyo; Yutaka Electric Mfg. Co. Ltd., Kanagawa, both of Japan

[21] Appl. No.: 702,159

[22] Filed: Aug. 23, 1996

[30] Foreign Application Priority Data

Aug. 24, 1995 [JP] Japan .................. 7-216102
Aug. 24, 1995 [JP] Japan .................. 7-216246

[51] Int. Cl.$^6$ ............................. H02M 7/5395
[52] U.S. Cl. .................. 363/132; 363/41; 363/98
[58] Field of Search ................. 363/40, 41, 95, 363/98, 123, 131, 132, 136

[56] References Cited

U.S. PATENT DOCUMENTS

| | | | |
|---|---|---|---|
| 4,480,299 | 10/1984 | Muto et al. | 363/41 |
| 4,660,137 | 4/1987 | Hotaka | 363/56 |
| 4,731,720 | 3/1988 | Takahashi | 363/21 |
| 4,757,434 | 7/1988 | Kawabata et al. | 363/41 |
| 4,803,611 | 2/1989 | Sashida et al. | 363/98 |
| 5,031,088 | 7/1991 | Tanaka | 363/71 |
| 5,072,354 | 12/1991 | Katto et al. | 363/41 |
| 5,099,408 | 3/1992 | Chen et al. | 363/41 |
| 5,373,223 | 12/1994 | Akagi et al. | 318/722 |
| 5,381,328 | 1/1995 | Umezawa et al. | 363/41 |
| 5,436,819 | 7/1995 | Mikami et al. | 363/41 |

Primary Examiner—Adolf Berhane
Attorney, Agent, or Firm—Pollock, Vande Sande & Priddy

[57] ABSTRACT

An inverter for DC/AC conversion includes an inverter bridge controlled by a PWM controller. The inverter has a first control loop for performing PWM control in accordance with the difference between the instantaneous AC value of an inverter output and an amplitude of waveform data read out from an AC waveform memory. The inverter also has a second control loop for multiplying the amplitude value of the waveform data by a coefficient adjusted on the basis of the error between the means AC current or voltage value of the inverter outputs and a target control value, and performing PWM control in accordance with waveform data having the adjusted amplitude. By using a delta scheme of finely increasing/decreasing at a time the coefficient by which waveform data is multiplied, an inverter with a high control precision and high stability can be obtained.

14 Claims, 25 Drawing Sheets

F I G. 2G
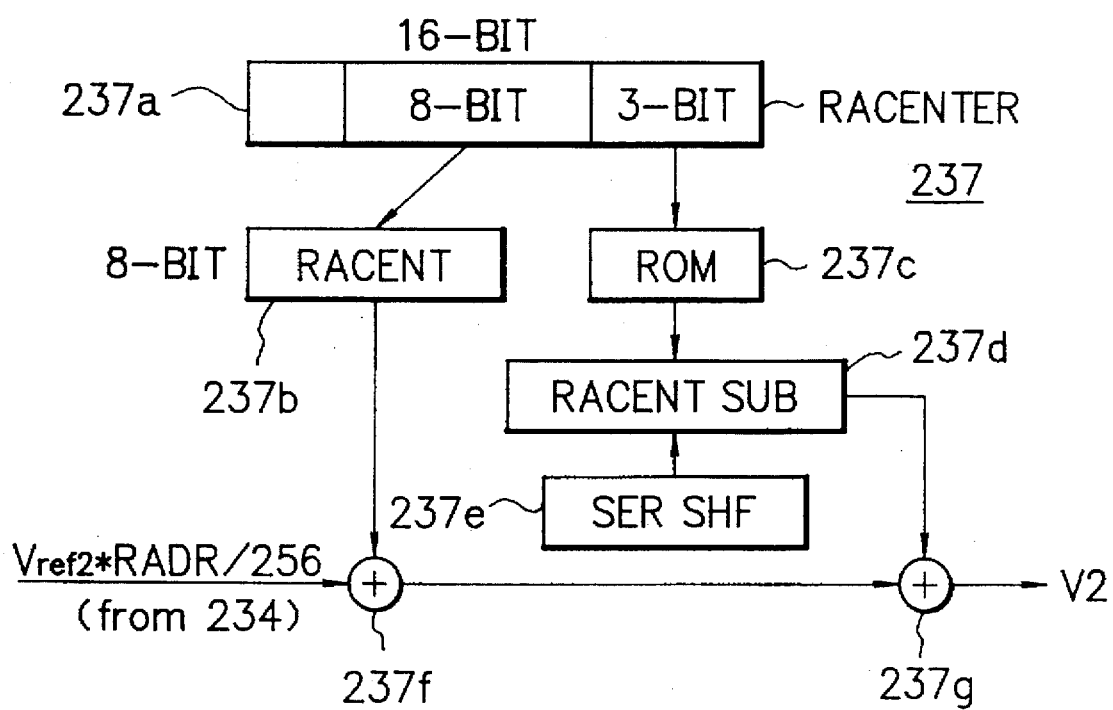

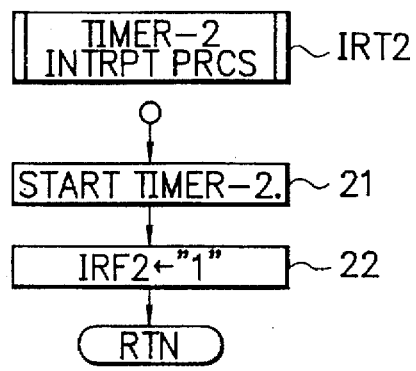
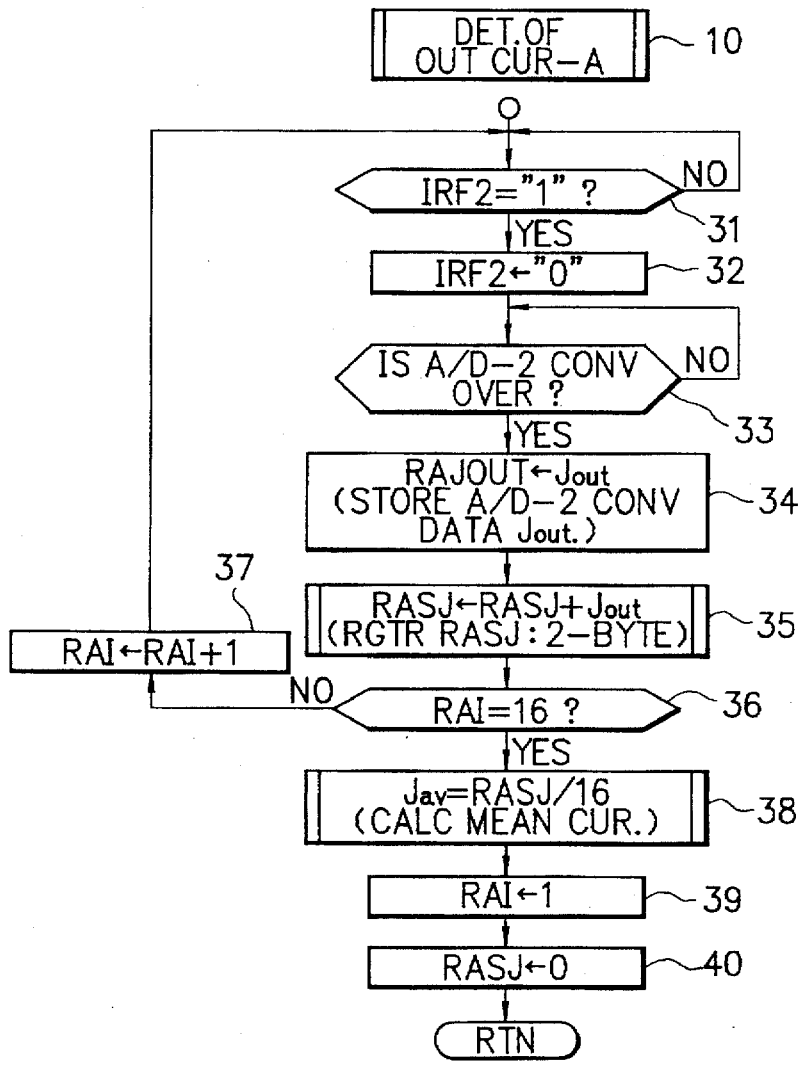

DATA CONSTITUTION OF RACENTER

POS HALF CYCLE INTERVAL
(0° ~ 180° *95/96)

NEG HALF CYCLE INTERVAL
(180° ~ (180° + 180° *95/96))

RACRENTSUB

AC OUTPUT CONTROL APPARATUS

BACKGROUND OF THE INVENTION

1. [Field of the Invention]

The present invention relates to an AC output control apparatus and, more particularly, to a so-called electronic inverter including a switching circuit for chopping a DC voltage by using switching elements to generate an AC voltage alternating positively and negatively in the form of pulses, and a PWM controller for applying PWM pulses to the switching circuit to convert the AC output voltage time-serially into a sine AC voltage having a predetermined frequency.

2. [Description of the Related Art]

The above switching circuit of an inverter of this type will be described with reference to FIG. 1, which shows an embodiment of the present invention. This circuit includes a first switching circuit section (Qu, Qy, 3u, 3y) arranged between DC voltage input terminals (2a, 2b) and AC output terminals (4a, 4b) to be simultaneously and synchronously turned on/off between one (4a) of the AC output terminals and one (2a) of the DC voltage input terminals and between the other AC output terminal and the other DC voltage input terminal, and a second switching circuit section (Qv, Qx, 3v, 3x) arranged between the DC voltage input terminals and the AC output terminals to be simultaneously and synchronously turned on/off between one (4a) of the AC output terminals and the other DC voltage input terminal (2b) and between the other AC output terminal (4b) and one (2a) of the DC voltage input terminals. The primary winding of a step-up transformer (6) is connected to the AC output terminals (4a, 4b), and the secondary winding of the transformer is connected to load output terminals (14a, 14b).

A rectangular voltage obtained by switching operations of the first and second switching circuit sections (Qu, Qy, 3u, 3y; Qv, Qx, 3v, 3x) using PWM pulses is smoothed by the step-up transformer (6), capacitors, and an inductance element (10) into a low-frequency AC voltage (e.g., 50 Hz) and output from the load output terminals (14a, 14b) to a load (LD). This AC output voltage and current are fed back to a power control circuit (16). The power control circuit (16) controls the duty ratio of a PWM pulse to set an output voltage to a target value.

In such AC output voltage control based on a PWM (pulse-width control) scheme, the following relationship is almost established between a duty ratio D of a PWM pulse and an instantaneous AC output voltage value Vout:

$$Vout = 2Vin(D-0.5)$$

If, for example, the duty ratio D is increased/decreased at 50 Hz, the output AC voltage has a frequency of 50 Hz.

In the PWM scheme, sine level data (the high level width, duty, and the like of a PWM pulse) corresponding to 0° to 90°, 0° to 180°, or 0° to 360° are stored in a memory such as a ROM in correspondence with the respective phases serving as addresses. Phase data is formed by counting clock pulses, and level data corresponding to the phase data is read out from the memory. A PWM pulse is generated on the basis of the readout level data. The above switching circuit sections are ON/OFF-driven on the basis of this PWM pulse. With this operation, a sine AC voltage with a high waveform precision is generated.

Such inverters (DC/AC power converters) are compact and highly efficient, and hence are widely used as the power supply circuits of various electronic devices such as an information processing apparatus. Conventionally, as the power control circuit (16), a dedicated analog IC has been used in many cases. Recently, however, such an analog IC has been replaced with a digital processing device, and more specifically, a microcomputer, a one-chip microcomputer, or a CPU, with a control program being installed therein. Since a digital processing device can realize advanced control on an inverter circuit with a small number of elements, a high-performance, inexpensive inverter can be realized. When the power control circuit (16) is mainly constituted by a digital processing device, an AC output voltage is A/D-converted into voltage data, and the duty ratio D of a drive pulse, i.e., a PWM pulse, to be applied to the above switching circuit is determined on the basis of a reference sine level data. The AC output voltage can be controlled to a target level by compensating for the duty ratio D with the voltage data. In general, the duty ratio D of a PWM pulse is proportional to input data (reference sine level data and voltage data) and changes within a range of 0 to 100% or $\alpha$ to $(100-\alpha)$ % in which $\alpha$ changes in a range of several %.

However, when power is supplied to the load, owing to the electrical characteristics of the load, variations in the characteristics, or the characteristics of the electrical circuit including the switching circuit and other components in the path to the load, the sine wave of the AC voltage applied to the load may be distorted, the AC voltage level may vary, an overcurrent may flow, or the AC voltage may contain a DC component (the level shift of the AC voltage in the positive or negative direction). These faults may steadily occur as well as temporarily. As a result, a power loss may occur and the load and the inverter itself may fail. A load demanding a constant current, a constant voltage, and a high sine waveform precision, in particular, is subjected to an operation error or a deterioration in function.

The output load of the above switching circuit includes inductance elements such as the step-up transformer (6) and the reactor (10) and the load (LD) itself may sometimes incorporate similar inductance elements. In this case, if a DC component is superimposed on an AC output, the magnetic core of an inductance element is saturated by this DC component. As a result, the inductance of the inductance element decreases, and the normal operation or function of the inductance element is impaired. Even if the above switching circuit performs a switching operation to output only AC components, a DC component maybe superimposed on an AC output because of the influences of variations in the characteristics of other inverter constituent elements and external noise. Therefore, such a DC component must be eliminated or suppressed.

For this reason, a conventional analog IC uses a method of biasing a DC component compensating DC voltage as a feedback voltage. Similarly, when a digital processing device is used, a DC bias is added to a feedback voltage before A/D conversion thereof so as to compensate for a DC component. However, since a DC component compensating DC voltage is not a fixed value (constant value) but needs to be adjusted, the DC bias circuit is complicated. As a result, the number of additional parts increases.

In order to compensate for the duty ratio D of a PWM pulse by digital arithmetic processing in the digital processing device to inhibit an AC output from having a DC component, for example, a compensation amount NC for DC component compensation may be uniformly added to PWM data NCPU, determined to output a sine AC output having a predetermined level, so as to shift the data in one direction. That is, it suffices to set the data NPWM for determining the duty ratio D of a PWM pulse as follows:

$$N_{PWM} = N_{CPU} + N_C$$

In this case, a minimum change width ΔD of the duty ratio D is determined by a bit size Nb of input data (reference sine level data and feedback voltage data). This value ΔD is given by $$\Delta D = [1/(\text{the } N_b\text{th power of } 2)] \times 100\%$$

If the bit size (digit size) of input data is large, e.g., 16 bits, since a duty ratio can be designated in small widths, i.e., the 16th power of 2=65,536 steps, the quantization range can be easily narrowed by the above compensation method to a range in which the influence of a DC component is small. If the bit size is small, e.g., 8 bits, since the change width ΔD of a duty ratio is as large as the 8th power of 2=256 steps, a DC component may not be finely and accurately suppressed. For this reason, in order to cancel a DC component, a digital processing device with a large bit count must be used. Consequently, the parts cost increases.

SUMMARY OF THE INVENTION

It is the first object of the present invention to provide an inverter for generating an AC output voltage with a high sine waveform precision. It is the second object of the present invention to provide an inverter having a high overcurrent inhibition effect. It is the third object of the present invention to provide an inverter having good constant voltage characteristics. It is the fourth object of the present invention to suppress the DC component of an output alternating current.

It is the fifth object of the present invention to provide an inverter using a digital processing scheme of obtaining a high DC component elimination effect by performing data processing with a relatively small number of bit size.

According to one embodiment of the AC output control apparatus of the present invention, there is provided an inverter for controlling an AC output to be supplied to a load on the basis of waveform data read out from an AC waveform memory. The inverter includes instantaneous value detection means for detecting the instantaneous values of a voltage and a current supplied to the load, and mean value detection means for adding up the instantaneous values of the voltage and the current supplied to the load in each specific phase interval and calculating mean AC values. These means are connected to the AC output terminals of the inverter. The inverter includes first control data generation means for comparing the mean current value with a predetermined target current value, and multiplying an amplitude value of the waveform data from the waveform memory by a coefficient value which is increased/decreased in accordance with a relationship in magnitude between the compared values, thereby generating first control data, also includes second control data generation means for comparing the mean voltage value with a predetermined target voltage value, and multiplying an amplitude value of the waveform data from the waveform memory by a coefficient value which is increased/decreased in accordance with a relationship in magnitude between the compared values, thereby generating second control data. The inverter further includes target value adjustment means for comparing the mean current value with the predetermined target current value, and increasing/decreasing the target current value in accordance with a relationship in magnitude between the compared values. The inverter also includes third control data generation means for generating third control data by adding the other control data to a difference between the instantaneous value of the voltage and one of the first and second control data. AC generation means is controlled by the third control data, and generates an output whose current and voltage are controlled with respect to the respective target values.

A high waveform precision and high-precision target value control performance can be obtained by the duplex control system using the first and second control data. A control system with a high control precision and high stability can be realized by using the delta scheme in which target value control and instantaneous value control are independently performed, and a coefficient by which waveform data is multiplied is increased/decreased little by little.

In addition, an overcurrent protection function can be obtained by setting an overcurrent limit value as a target current value.

According to another aspect of the present invention, the inverter further includes integration means for detecting a DC component of an AC output by adding up the mean current or voltage value in each AC half cycle in consideration of a polarity therein, adjustment means for comparing an output from the integration means with a predetermined range, increasing/decreasing DC adjustment data by a small amount when the output falls outside the range depending on whether the output is above or below the range, and holding the previous value of the DC adjustment data when the output falls within the range and DC shift means for adding the DC adjustment data to the second control data. With this arrangement, a DC compensation loop operation is performed such that the DC component of the output from the AC generation means becomes a value within the range and decreases to an amount which can be substantially neglected with respect to an AC component. The DC component of an output alternating current can therefore be sufficiently suppressed.

According to still another aspect of the present invention, the inverter includes first addition means for adding an upper bit group of the DC adjustment data to the second control data, memory means from which fine adjustment data having "1"s corresponding in number to a value represented by a lower bit group is read out by using the lower bit group of the DC adjustment data as an address, serial shift means for serially shifting the fine adjustment data in units of bits for every DC compensation loop, and second addition means for adding a "1" output from the serial shift means to an output from the first addition means. A high DC component inhibition effect can therefore be obtained by data processing with a relatively small number of bits.

BRIEF DESCRIPTION OF THE DRAWINGS

The other objects and features of the present invention will be apparent from the following description of the embodiments with reference to the accompanying drawings.

FIG. 2G is a block diagram showing the detailed arrangement of a DC shift section 237 in FIG. 2B;

FIG. 4 is a flow chart showing the contents of "timer-2 interrupt processing" (IRT2) performed by the microcomputer 22 in FIG. 2A;

FIG. 5 is a flow chart showing the contents of "detection of output current-A" (step 10) in FIG. 3;

DETAILED DESCRIPTION OF THE PREFERRED EMBODIMENTS

First Embodiment

Figure 1:
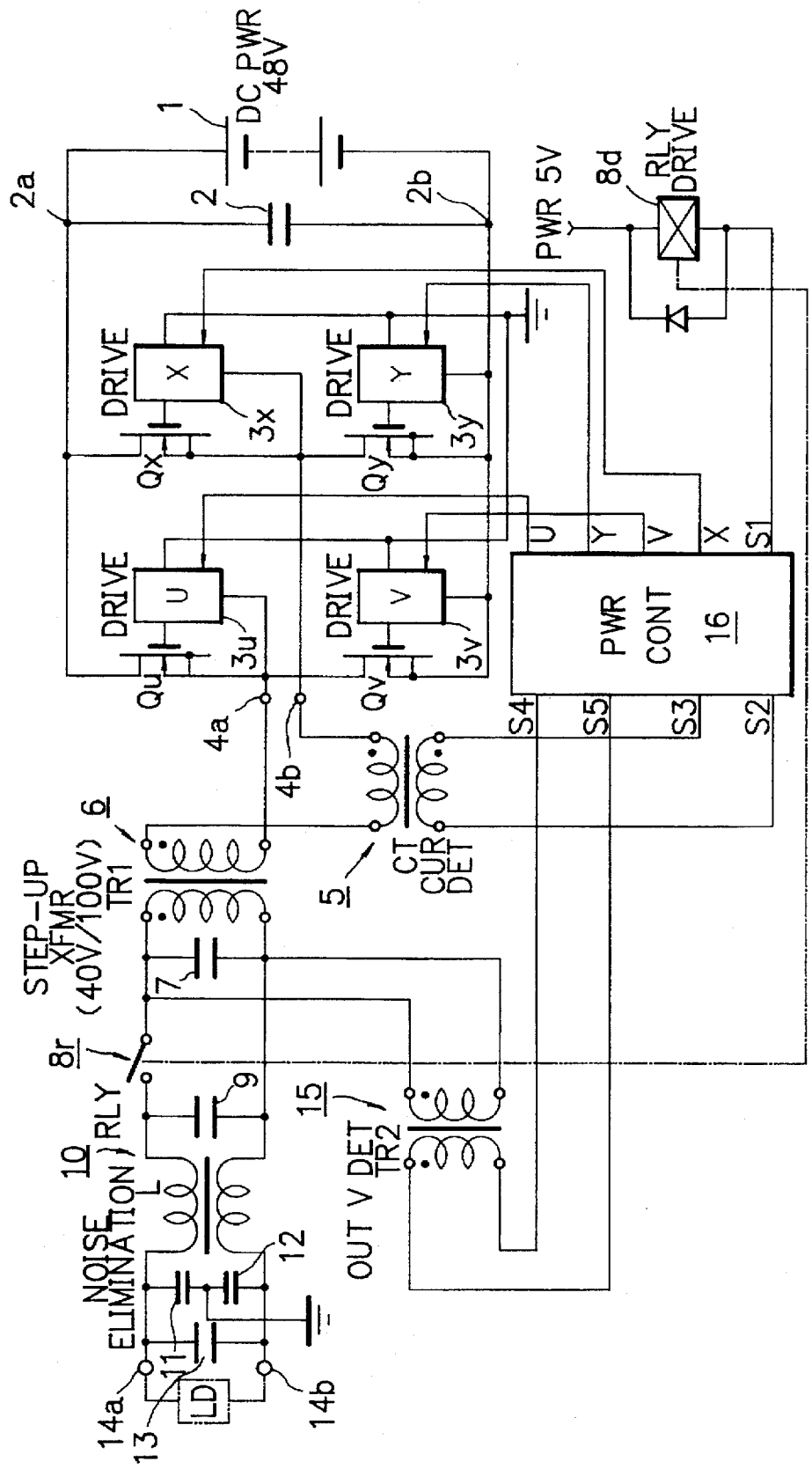
FIG. 1 is a circuit diagram showing a PWM inverter according to the first embodiment of the present invention.

FIG. 1 shows the first embodiment of the present invention. A capacitor 2 and an inverter bridge 3 are connected to a DC power supply 1. The inverter bridge 3 has a series circuit of switching elements Qx and Qy and a series circuit of switching elements Qu and Qv. A terminal 4b between the switching elements Qx and Qy and a terminal 4a between switching elements Qu and Qv are the AC output terminals of the inverter bridge 3 consisting of the switching elements Qx, Qy, Qu, and Qv. The DC power supply 1 and the capacitor 2 are connected in parallel with DC voltage input terminals 2a and 2b of the inverter bridge 3 when viewed from the inverter bridge 3.

The switching elements Qx and Qy, and the switching elements Qu and Qv are respectively turned on/off by switching drive circuits 3x and 3y, and switching drive circuits 3u and 3v. ON/OFF instruction signals (low level L indicates an ON instruction; high level H indicates an OFF instruction) X, Y, U, and V for the respective switching elements are respectively supplied from a power control circuit 16 to the switching drive circuits 3x, 3y, 3u, and 3v. When the ON/OFF instruction signals X and V are set at ON instruction level L, and at the same time, the ON/OFF instruction signals Y and U are set at OFF instruction level H, the switching elements Qx and Qv are turned on, and the switching elements Qy and Qu are turned off. As a result, the switching output terminal 4b is set at the positive potential (+) of the DC power supply 1, and the switching output terminal 4a is set at the negative potential (−) of the DC power supply 1. In contrast to this, when the ON/OFF instruction signals X and V are set at OFF instruction level H, and at the same time, the ON/OFF instruction signals Y and U are set at ON instruction level L, the switching elements Qx and Qv are turned off, and the switching elements Qy and Qu are turned on. As a result, the switching output terminal 4b is set at the negative potential (1) of the DC power supply 1, and the switching output terminal 4a is set at the positive electrode (+).

An AC voltage (pulse) is generated between the switching output terminals 4a and 4b by alternately repeating an X/V ON mode of setting the ON/OFF instruction signals X and V at ON instruction level L and setting the ON/OFF instruction signals Y and U at OFF instruction level H, and a Y/U ON mode of setting the ON/OFF instruction signals X and V at OFF instruction level H and setting the ON/OFF instruction signals Y and U at ON instruction level L.

This AC voltage is boosted by a step-up transformer 6 through a current detection transformer 5, and shaped into a sine wave by a capacitor connected in parallel with the secondary winding of the step-up transformer 6. The resultant voltage is applied to capacitors 11 to 13 through a noise elimination inductance element (reactor) 10. The capacitors 11 and 12 set a common potential (device ground) at the middle point between the upper and lower peaks of the AC voltage. A load LD is connected in parallel with the noise elimination (absorption) capacitor 13.

Reference numerals 14a and 14b denote load connection terminals, i.e., the output terminals of the inverter (DC/AC converter) shown in FIG. 1. A transformer 15 for detecting an output voltage is connected in parallel with the secondary winding of the step-up transformer 6.

A normally open contact of a relay 8r is interposed between the step-up transformer 6 and the inductance element 10, and relay drive circuit 8d energizes the relay 8r. The power control circuit 16 supplies an energization instruction signal S1 to the relay drive circuit 8d. When the energization instruction signal S1 is set at low level L, the relay drive circuit 8d energizes the electric coil (not shown) of the relay 8r. As a result, the relay contact is closed. That is, an AC voltage is applied to the load LD connected between the inverter output terminals (load connection terminals) 14a and 14b (load energization). When the energization instruction signal S1 is set at high level H, the relay drive circuit 8d interrupts the current to the electric coil (not shown) of the relay 8r. As a result, the relay contact is opened. That is, no voltage is applied to the load LD connected between the inverter output terminals 14a and 14b (load interruption: no load).

Figure 2A:
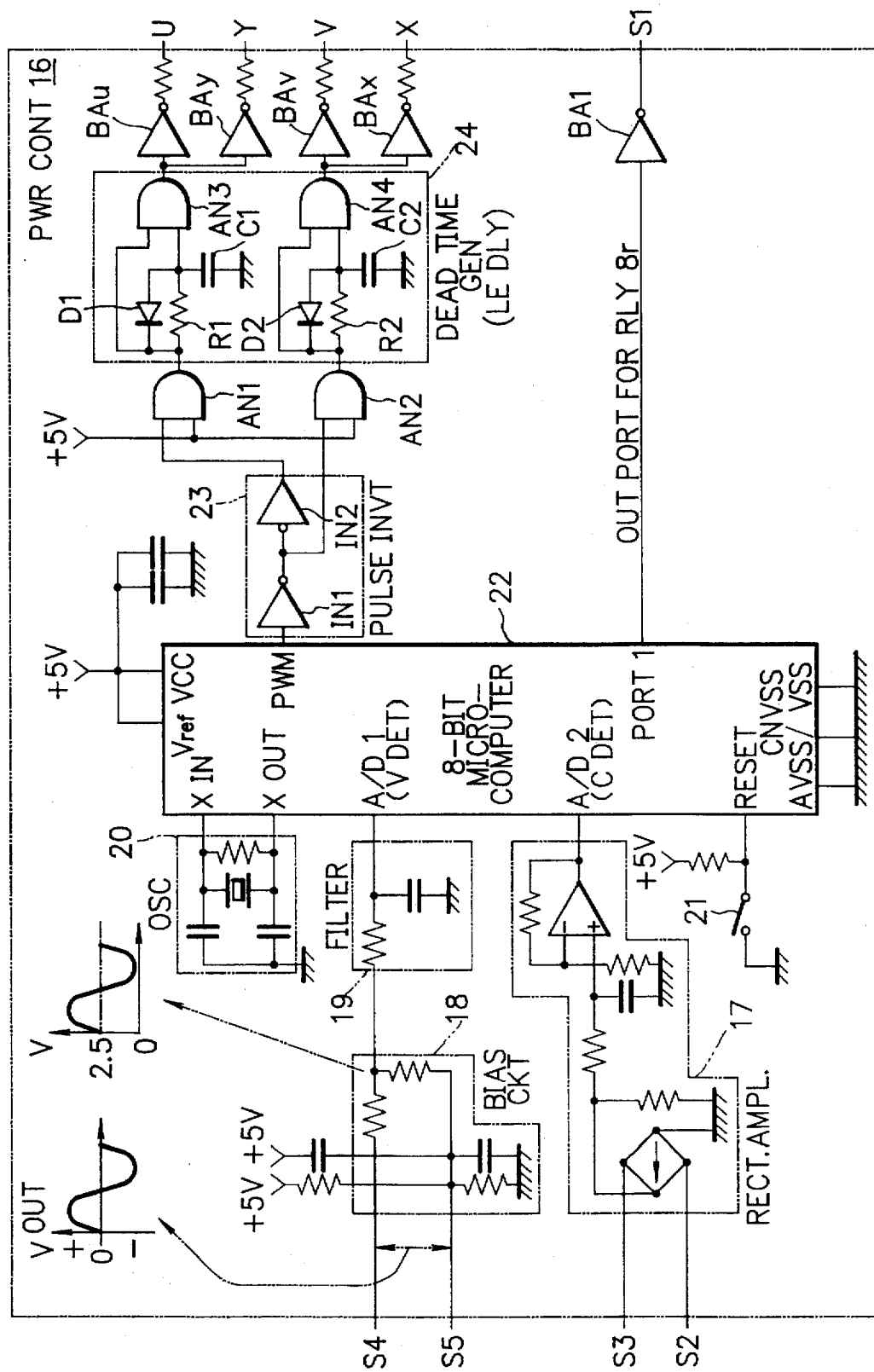
FIG. 2A is a circuit diagram showing the arrangement of a power control circuit 16 in FIG. 1.

FIG. 2A shows the arrangement of the power control circuit 16 in FIG. 1. This circuit 16 has an 8-bit microcomputer 22 as a main component. A current (instantaneous load current value) in the secondary winding of the load current detection transformer 5 is subjected to rectification, noise (high-frequency components) elimination, and amplification in a rectification/amplification circuit 17. As a result, the current is converted into a voltage representing a pulsating current value with negative half cycle wave being inverted into a positive half cycle wave. This voltage is applied to a second A/D conversion input port A/D2 of the computer 22.

The computer 22 digitally converts and reads this voltage (the absolute value of the instantaneous load current value) at a predetermined sampling period (Ts2=6/9.6 kHz≈625 μsec). This data will be referred to as a detected load current value. Note that this detected load current value is the instantaneous value (absolute value) of the AC current output (load current), i.e., the instantaneous output current value (absolute value).

The secondary winding voltage (instantaneous load voltage value) of the load voltage detection transformer 15 has a sine wave (50 Hz) which oscillates in the positive and negative directions with the common potential (device ground) being regarded as a center. A bias circuit 18 biases this AC voltage by +2.5 V to generate a pulsating voltage which substantially oscillates in a positive voltage range. This pulsating voltage is applied to a first A/D conversion input port A/D1 of the computer 22 through a high-frequency noise elimination filter 19. The computer 22 digitally converts and reads this voltage (instantaneous load voltage value) at a predetermined sampling period (Ts1=1/9.6 kHz≈104.17 μsec). This data will be referred to as an instantaneous load voltage value. Note that this instantaneous load voltage value is an instantaneous value of the AC voltage output (load voltage, that is, a positively biased value).

An oscillator 20 oscillates at a frequency f=7.3728 MHz, and supplies a signal (clock pulse) having this frequency to the computer 22. Reference numeral 21 denotes a reset switch.

The computer 22 outputs a PWM pulse having a predetermined pulse period (Tpwm=255/f≈34.59 μsec) from PWM pulse output terminal PWM to a pulse inverter 23. The pulse inverter 23 outputs a pulse in phase with this PWM pulse to an AND gate AN1, and a pulse 180° out of phase (inverted) with respect to the PWM pulse to an AND gate AN2. The AND gates AN1 and AN2 respectively supply the pulse in phase with the PWM pulse (positive-phase pulse) and the pulse 180° out of phase with respect to the PWM pulse (negative-phase pulse) to a dead time generation circuit 24.

The dead time generation circuit 24 generates a positive-phase drive pulse which is synchronous with the positive-phase pulse. In addition, the L (Low) to H (High) transition of this drive pulse is delayed by a short time determined by the values of a resistor R1 and a capacitor C1, but the H to L transition occurs substantially without any delay. The drive pulse is level-inverted by buffer amplifiers BAu and BAy (inverters) and output to the switching drive circuits 3u and 3y (signals U and Y). The dead time generation circuit 24 also generates a negative-phase drive pulse which is synchronous with the negative-phase pulse. In addition, the L to H transition of this drive pulse is delayed by a short time determined by the values of a resistor R2 and a capacitor C2, but the H to L transition occurs substantially without any delay. The drive pulse is level-inverted by buffer amplifiers BAy and BAx and output to the switching drive circuits 3v and 3x (signals V and X).

In one period (Tpwm=255/f≈34.58 μsec) of a PWM pulse output, both positive- and negative-phase drive pulses are kept at L level, and all the switching elements Qu, Qy, Qv, and Qx are kept off for the short time after the PWM pulse makes a Low to High transition at the start of the period. After the lapse of the short time, the positive-phase drive pulse is kept at H level, and the switching elements Qu and Qy are turned on (the terminals 4a and 4b become positive and negative, respectively), but the switching elements Qv and Qx are kept off until the end of the H (High) interval (Vpwm) of the PWM pulse. The PWM pulse is set at L level. Similarly, the positive-phase pulse is set at L level to turn off the switching elements Qu and Qy. However, the negative-phase drive pulse is kept at L level for the short time, and hence all the switching elements Qu, Qy, Qv, and Qx are kept off for the short time.

After the short time, in the L interval of the PWM pulse, the negative-phase drive pulse is set at H level to turn on the switching elements Qv and Qx (the terminals 4a and 4b become negative and positive, respectively). At the end of one period (at the start of the next period) of the PWM pulse, the PWM pulse is set at H level. The negative-phase drive pulse is set at L level substantially in synchronism with the PWM pulse. As a result, all the switching elements Qu, Qy, Qv, and Qx are kept off for the next short time (a short time after the start of the next period).

That is, the dead time generation circuit 24 sets an all switching element OFF interval of a short time between the instant at which the switching elements Qu and Qy are turned on and the instant at which the switching elements Qv and Qx are turned on. Such an interval is set to eliminate the possibility that the switching elements Qu and Qy are turned on at the same time the switching elements Qv and Qx are turned on, which may result in short-circuit of the DC power supply 1.

As described above, in one period (Tpwm=255/f≈34.59 μsec) of a PWM pulse, when the above short time is neglected, the switching elements Qu and Qy are turned on in the H interval (Vpwm) of the PWM pulse with the terminals 4a and 4b becoming positive and negative, respectively, and the switching elements Qv and Qx are turned on in the next L interval (Tpwm−Vpwm) with the terminals 4a and 4b becoming negative and position, respectively.

That is, a one-period alternating current (pulse) appears at the output terminals 4a and 4b of the switching circuit within one period (Tpwm) of a PWM pulse. When the duty ratio of a PWM pulse is 50% (Vpwm=Tpwm/2), since a capacitor is connected in parallel with the secondary winding of the step-up transformer 6, the high-frequency components of the secondary winding voltage are absorbed (smoothed) by the capacitor, resulting in substantially zero in low-frequency component (50 Hz). When the duty ratio (its H interval) of a PWM pulse is continuously increased/decreased with respect to a duty ratio of 50% at a period of 50 Hz, i.e., pulse-width modulation (PWM) is performed, the secondary winding voltage of the step-up transformer 6 (the voltage across the capacitor connected in parallel therewith) becomes a 50-Hz AC voltage. In the first embodiment, the computer 22 performs this pulse-width modulation. That is, the computer 22 performs pulse-width modulation (PWM) to output a 50-Hz AC voltage.

In the first embodiment, when the power to the inverter circuit shown in FIG. 1 is turned on, an AC voltage is not immediately output to the load LD, but an output current is detected first to perform overcurrent control and DC component compensation, and the relay 8r is then turned on to supply power to the load. An ON instruction signal (H: relay on/L: relay off) for the relay 8r, which is output from a port 1 of the computer 22, is level-inverted to form the output S1 from the power control circuit 16 and supplied to the relay drive circuit 8d through a buffer amplifier (inverter) BA1.

The constituent elements and operation of the PWM inverter of this embodiment will be described next with reference to FIG. 2B.

As described above, power from the DC power supply 1 is converted into AC PWM pulse power by the inverter bridge 3.

This power is converted into power having a sine AC waveform by a filter 40 constituted by the transformer 6 and the capacitor 7 in FIG. 1. The resultant power is supplied to the load LD through the relay 8r. The current and voltage of the AC power supplied to the load are respectively detected by an output current detector 41 corresponding to the load current detection transformer 5 in FIG. 1 and an output voltage detector 42 corresponding to the load voltage detection transformer 15 in FIG. 1. The detected instantaneous output current and voltage are respectively converted into digital data Jout and Vout by A/D converters 22d and 22e.

Figure 2B:
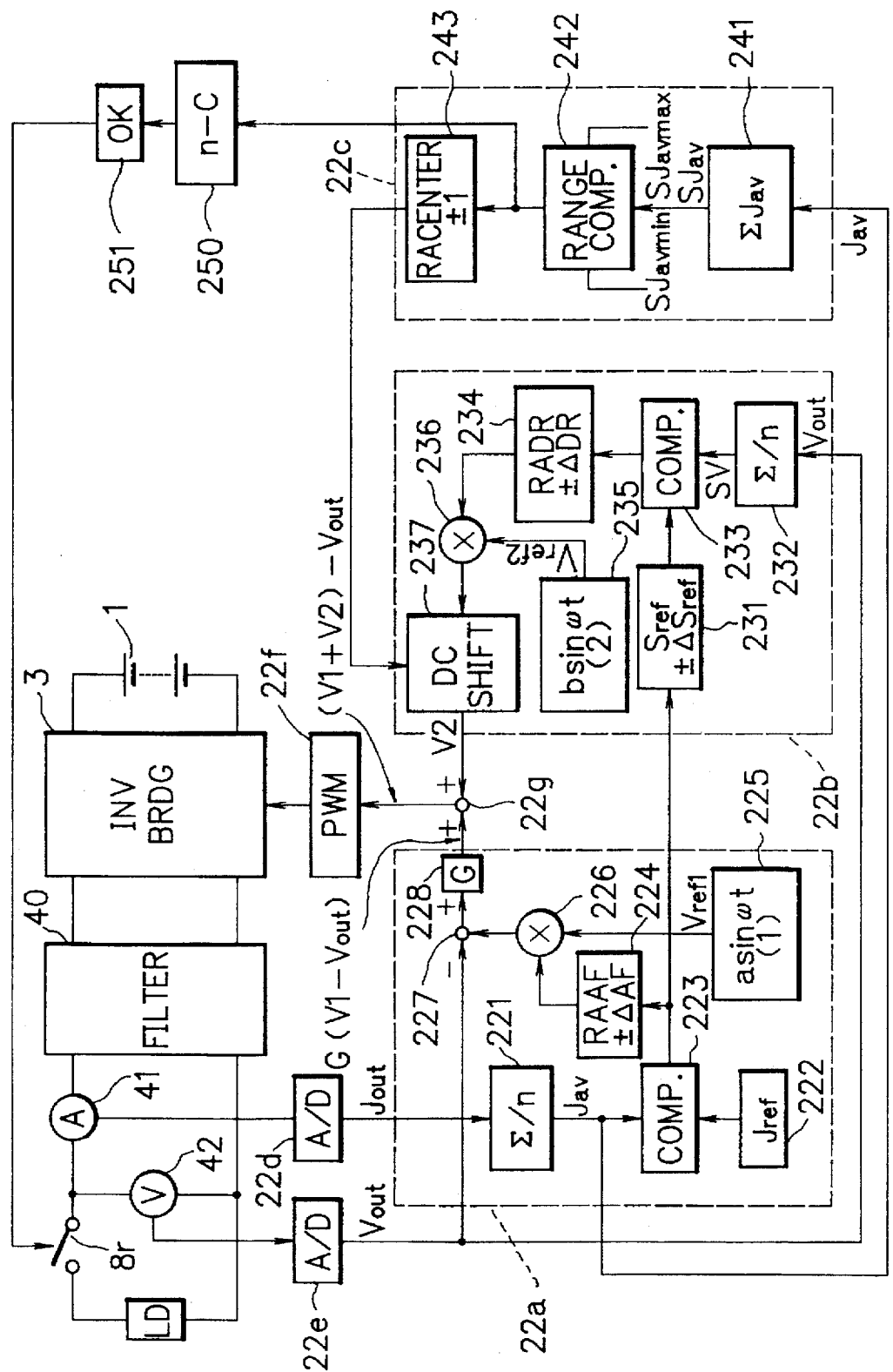
FIG. 2B is a functional block diagram showing a microcomputer 22 in FIG. 2A and a PWM inverter realized by execution programs of the microcomputer.

The control function realized by programs in the microcomputer 22 in FIG. 2A is constituted by a proportional control section 22a, an integration control section 22b, and a DC component compensation section 22c which are indicated by the dotted lines in FIG. 2B. The proportional control section 22a and the integration control section 22b operate while the inverter is initialized or power is supplied to the load, but the DC component compensation section 22c operates only while the inverter is initialized.

Outputs from the proportional control section 22a and the integration control section 22b are amplitude data of a sine wave which determines an AC output. The respective outputs are added by an addition section 22g. The resultant amplitude data is supplied to a PWM section 22f for converting the data into the duty ratio of a PWM pulse. The PWM section 22f generates a PWM pulse whose duty ratio corresponds to the instantaneous amplitude value of a sine wave and continuously changes in accordance with a sine change in amplitude value. The PWM section 22f supplies this PWM pulse to the inverter bridge 3.

In the proportional control section 22a, the instantaneous output voltage Vout from the A/D converter 22e is subtracted from a first target value V1 by a subtraction section 227 to obtain an error signal V1−Vout with respect to the target value. A gain multiplication section 228 multiplies this error signal by a gain G, and outputs the resultant signal to the addition section 22g. The output from the proportional control section 22a is therefore given by $$G*(V1-Vout).$$

The gain G may be 1.

The first target value V1 is generated on the basis of first reference sine wave data Vref1 (asin ωt) read out from a sine wave data memory 225 (table TSIN1) constituted by a ROM in the microcomputer 22 according to a predetermined time axis address. A multiplication section 226 multiplies this first reference sine wave data by a first adjustment coefficient RAAF/256 (256 is an 8-bit full scale value) for overcurrent control, and supplies the resultant value as the first target value V1 to the subtraction section 227. As described above, the instantaneous output voltage Vout is subtracted from the first target value V1 to calculate an error signal V1−Vout.

The first adjustment coefficient RAAF/256 is generated as follows. The instantaneous output current value Jout from the A/D converter 22d is supplied to an integrating/averaging section 221 to calculate a mean AC current value Jav. A comparing section 223 compares this mean value Jav with an overcurrent set value Jref stored in an overcurrent storage section 222 in the ROM. An adjustment section 224 then increases/decreases a first adjustment value RAFF by a small amount ΔAF at a time or holds its previous value in accordance with the comparison result (Jav>Jref, Jv<Jref, or Jav=Jref), thereby generating the first adjustment coefficient RAAF/256. The first target value V1 is therefore instantaneous sine wave data (Vref1*RAAF/256) obtained by increasing/decreasing the amplitude of the first reference sine wave data Vref1 with an adjustment coefficient RAAF, and is also control data for feeding back the instantaneous output voltage Vout to make an output AC voltage waveform follow the amplitude of the reference sine wave and prevent the detected mean AC current value from exceeding the overcurrent set value. Note that the integrating/averaging section 221 generally adds up sampled amplitude values of the instantaneous output current value Jout in a half wave cycle, and divides the integrated value by a sample count n, thereby calculating the mean AC current value Jav.

Figure 2C:
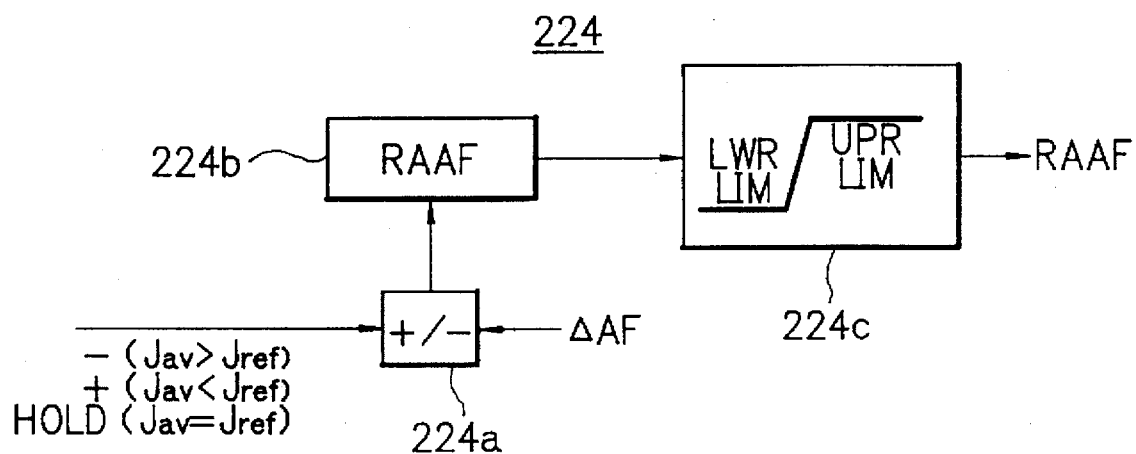
FIG. 2C is a block diagram showing the detailed arrangement of an adjustment section 224 in FIG. 2B.

FIG. 2C shows the detailed arrangement of the adjustment section 224. An arithmetic section 224a increases/decreases the reference voltage value RAAF in units of ±ΔAF in accordance with the result of comparison between the mean AC current value Jav and the set current value Jref. Data from a register 224b in which adjustment results are held is supplied to a limiter section 224c to be limited such that the value of the data does not exceed the upper and lower values.

The integration control section 22b generates a second target value V2 on the basis of a mean AC voltage value. The second target value V2 (Vref2*RADA/256) is basically generated as follows. The instantaneous output voltage Vout from the A/D converter 22e is supplied to an integrating/averaging section 232 to calculate a mean AC voltage value SV in a half cycle. The amplitude value of second reference sine wave data Vref2 (bsin ωt) read out from a sine wave data memory 235 (table TSIN2) constituted by a ROM in the microcomputer 22 according to a predetermined time axis address is multiplied by a second adjustment coefficient RADR/256 adjusted in accordance with this mean value, thereby generating the second target value V2.

More specifically, in the integration control section 22b, a comparing section 233 compares the mean AC voltage value SV from the integrating/averaging section 232 with a reference voltage value Sref, and an adjustment section 234 increases/decreases a second adjustment value RADR by a small amount ΔDR at a time or holds its previous value in accordance with the comparison result (SV<Sref, SV>Sref, or SV=Sref), thereby generating the second adjustment coefficient RADR/256. A multiplication section 236 multiplies this adjustment coefficient RADR/256 by the second reference sine wave data Vref2, thereby outputting the second target value V2 through a DC shift section 237 (to be described later).

The output V2 from the integration control section 22b is output to the addition section 22g to be added to the output G*(V1−Vout) from the proportional control section 22a. Control data to be finally supplied to the PWM section 22f is therefore given by $$G*(V1-Vout)+V2.$$

If the gain G is 1, the above expression is equivalent to (V1+V2)−Vout or (V2−Vout)+V1. That is, the second target value V2 is instantaneous sine wave data obtained by increasing/decreasing the amplitude of the second reference sine wave data Vref2 with the adjustment coefficient RADR, and is also control data for feeding back the instantaneous output voltage Vout to make an output AC voltage waveform follow the amplitude of the reference sine wave and match the detected mean AC voltage value SV with the reference voltage value Sref.

Figure 2D:
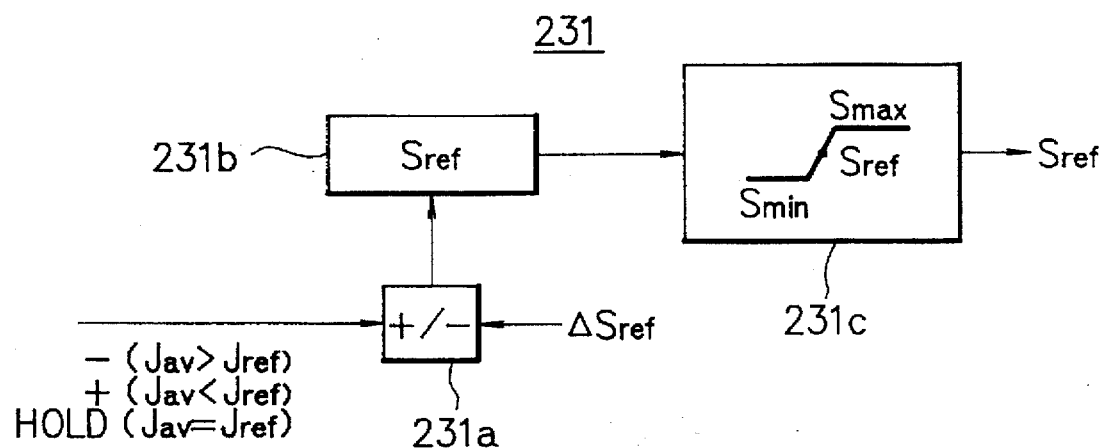
FIG. 2D is a block diagram showing the detailed arrangement of an adjustment section 231 in FIG. 2B.

The reference voltage value Sref is adjusted by increasing/decreasing by a small amount ΔSref at a time or by holding its previous value by an adjustment section 231 in accordance with the result of comparison (output from the comparing section 223) between the mean AC current value Jav and the overcurrent set value Jref in the proportional control section 22a. As shown in FIG. 2D, which shows the detailed arrangement of the adjustment section 231, an arithmetic section 231a increases/decreases the reference voltage value Sref by ±ΔSref in accordance with the result of comparison between the mean AC current value Jav and the overcurrent set value Jref. Data from a register 231b in which the adjustment result is held is supplied to a limiter section 231c to be limited such that the value of the data does not exceed an upper limit Smax and a lower limit Smin. The upper limit Smax is set to a constant value such that the root-mean-square value of an AC output voltage just becomes a rated voltage of 100 V.

When a load below a rating at which no overcurrent flows is driven, since Jav<Jref, the reference voltage value Sref is increased up to the upper limit Smax and is stopped at Smax.

In this state, the reference voltage value Sref is compared with the mean AC voltage value SV, as described above, and the second reference sine wave data Vref2 is multiplied by the adjustment coefficient RADR/256 adjusted in accordance with the comparison result, thereby outputting the second target value V2. With this operation, the output voltage from the inverter is maintained at the rated voltage of 100 V (root-mean-square value).

When a load in which an overcurrent flows is connected to the output of the inverter, since Jav>Jref, the reference voltage value Sref is decreased. As a result, the mean AC voltage value SV becomes SV>Sref. Since the second adjustment value RADR is decreased, the output voltage from the inverter is decreased by the above loop control, and the mean AC current value Jav is decreased. This decrease in mean current value is also executed by decreasing the first adjustment value RAFF in the proportional control section 22a. In this case, overcurrent limiting control is performed by both the proportional control section 22a and the integration control section 22b for the following reason. Assume that the integration control section 22b does not perform control to decrease the reference voltage value Sref when an overcurrent flows. In this case, when the proportional control section 22a performs feedback control to decrease the voltage Vout so as to decrease the mean AC current value Jav when an overcurrent flows, the integration control section 22b performs conflicting feedback control to prevent the output voltage Vout from decreasing below the reference voltage value Sref.

Figure 2E:
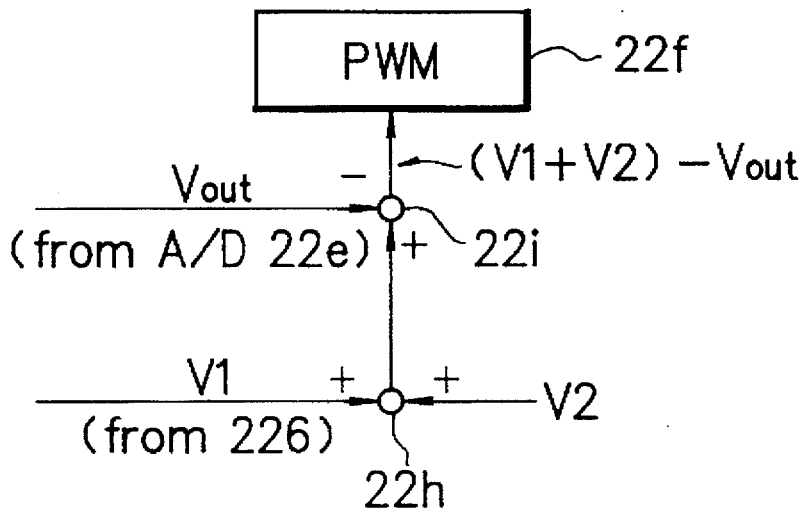
FIG. 2E is a block diagram showing the main part of a modification of a portion in FIG. 2B.
Figure 2F:
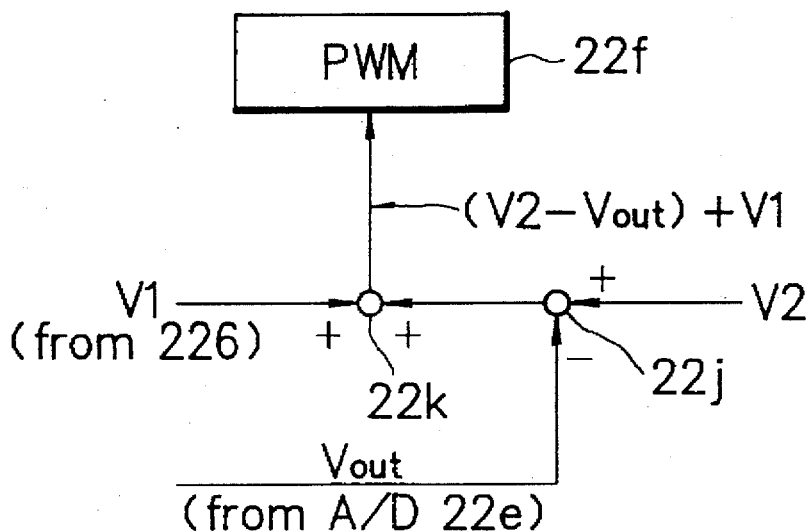
FIG. 2F is a block diagram showing the main part of another modification of a portion in FIG. 2B.

As described above, since final control data to be supplied to the PWM section 22f is equivalent to (V1+V2)−Vout or (V2−Vout)+V1, a change like the one shown in FIG. 2E or 2F can be made. Referring to FIG. 2E, an addition section 22h adds the first target value V1 from the multiplication section 226 in the proportional control section 22a to the second target value V2 from the integration control section 22b, and a subtraction section 22i subtracts the instantaneous output voltage Vout from the addition result, thereby obtaining control data. Referring to FIG. 2F, a subtraction section 22j subtracts the instantaneous output voltage Vout from the second target value V2 from the integration control section 22b, and an addition section 22k adds the substraction result to the first target value V1 from the multiplication section 226 in the proportional control section 22a, thereby obtaining final control data. Either modification is obtained by only changing the order of the program steps in the microcomputer 22.

The DC component compensation section 22c will be described below with reference to FIG. 2B. This compensation section 22c operates to generate DC component compensation data while the inverter is initialized. Thereafter, only a DC shift or DC cancellation based on the compensation data is performed. This DC component compensation data is supplied to the DC shift section 237 located at the output terminal of the integration control section 22b to be simply added to the second target value V2.

In the DC component compensation section 22c, an integration section 241 adds up mean AC current values Jav corresponding to, for example, five cycles (10 half cycles), which are obtained by the integrating/averaging section 221 in the proportional control section 22a every AC half cycles, with each positive half cycle portion being positive, and each negative half cycle portion being negative. As a result, a DC component SJav of the inverter output can be detected from the integration section 241.

A range comparing section 242 compares the DC component SJav with a set target range SJavmax/SJavmin. An adjustment section 243 increases/decreases a DC component adjustment value RACENTER by one in accordance with the comparison result. More specifically, if the DC component SJav exceeds a target upper limit SJavmax, the DC component adjustment value RACENTER is decreased by one. If the DC component SJav is below a target lower limit SJavmin, the DC component adjustment value RACENTER is increased by one. If the DC component SJav falls within the target range, the previous value of the adjustment value is held.

The adjustment value RACENTER is sent to the DC shift section 237 to be added to an output (RADR/256)*Vref2 from the multiplication section 236. With this operation, the DC component is compensated by ±1 in a control loop cycle. When the DC component falls within the target range, i.e., SJavmax≧SJav≧SJavmin, compensation loop control is stopped, and the corresponding DC component adjustment value RACENTER is held. Subsequently, DC cancellation based on this adjustment value is simply executed by the DC shift section 237.

If the range comparing section 242 detects SJavmax≧SJav≧SJavmin, the detection result is sent to an n-count section 250. If it is determined that the compensation loop has detected this state n times, e.g., 12 times, a determination section 251 determines that the DC component compensation loop has converged, and closes the output relay switch 8r of the inverter. As a result, an inverter output whose DC component has been canceled is supplied to the load LD.

In order to ensure the high precision of the DC component adjustment value RACENTER, this data is expressed by 16 bits. However, since the microcomputer 22 can handle only 8-bit data at once, only compensation with a resolution corresponding to 8 bits can be performed. For this reason, as shown in FIG. 2G, in the DC shift section 237, 16-bit adjustment value is divided into upper and lower bits, and coarse adjustment and fine adjustment are performed in a time serial manner.

Referring to FIG. 2G, the upper 8-bit data obtained by omitting the lower 3 bits from the adjustment value RACENTER held in a register 237a is extracted, as coarse adjustment data RACENT with a precision ⅛ that of the original adjustment value, into a register 237b. The addition section 237f adds this data to the second reference sine wave data Vref2 multiplied by the second adjustment coefficient RADR/256 from the multiplication section 236 of the integration control section 22b for every cycle of the DC component compensation loop (for every compensating operation). The second target value V2 is therefore given by $$V2=(RADR/256)*Vref2+RACENT.$$

The lower 3 bits of the DC component adjustment value RACENTER are supplied as an address to a ROM 237c, and 8-bit fine adjustment data RACENTSUB including "1"s equal in number to the value "0" to "7" expressed by the 3 bits is read out in a register 237d. If, for example, the lower 3 bits represent the value "3", "10010010" is read out as fine adjustment data. A serial shift section 237e causes an addition section 237g to add this fine adjustment data to an output from the addition section 237f for every cycle of the DC component compensation loop. When a compensation loop operation is performed eight times, addition of "+1" is executed three times. Therefore, DC component compensation is performed with a precision of ⅜ with respect to the minimum compensation unit of coarse adjustment data on average.

According to the above description, the sine wave data memories 225 and 235 are respectively used for the proportional control section 22a and the integration control section 22b. However, one memory may be used instead of these two memories. More specifically, one memory in which a sine wave having an amplitude of 1 is stored is used, and amplitudes a and b of the first and second reference sine wave data Vref1 and Vref2 stored in the sine wave memories 225 and 235 are respectively contained in the first and second adjustment values RAAF and RADR.

In addition, according to the above description, an AC sine wave signal from the output current detector 41 and the output voltage detector 42 is directly processed. However, in order to facilitate processing in the microcomputer, as in the following embodiment, the detected AC sine wave signal may be biased to be handled as a unipolar detection signal. In this case, in the proportional control section 22a, before a calculation of V1−Vout is executed by the subtraction section 227, a constant corresponding to the bias must be added to the first target value V1. For example, V1+128.

Furthermore, according to the above description, a one-period full wave can be stored as sine waveform data Vref in the waveform memory. As in the following embodiment, only waveform data corresponding to a half wave component may be stored to save the ROM area for waveform data. In this case, polarity inversion processing is performed with respect to the outputs V1 and V2 from the multiplication sections 226 and 236 in accordance with positive and negative half waves. When process data is biased, calculations of V1+128 and 128−V1 are alternately performed with respect to the output V1 from the multiplication section 226 in accordance with positive and negative half waves. In addition, the DC shift section 237 of the integration control section 22b alternately performs shift processing calculations for DC component compensation in accordance with positive and negative half waves as follows:

$$V2=(RADR/256)*Vref2+RACENT$$

$$V2=RACENT-(RADR/256)*Vref2$$

As shown in FIG. 2F, when the instantaneous output voltage Vout is to be subtracted from the second target value V2, the addition route (addition section 22k) for the first target value V1, and the sine wave data memory 225, the multiplication section 226, and the adjustment section 224 in the proportional control section 22a can be omitted.

In the integration control section 22b, as described above, feedback control of Vref2*RADR/256−Vout is performed to match the output voltage Vout with the predetermined reference voltage Sref. The reference voltage Sref is adjusted by an output from the comparing section 223 such that the mean AC current value Jav does not exceed the overcurrent set value Jref, as described above. Voltage and current control is therefore performed by only the integration control section 22b.

Figure 3:
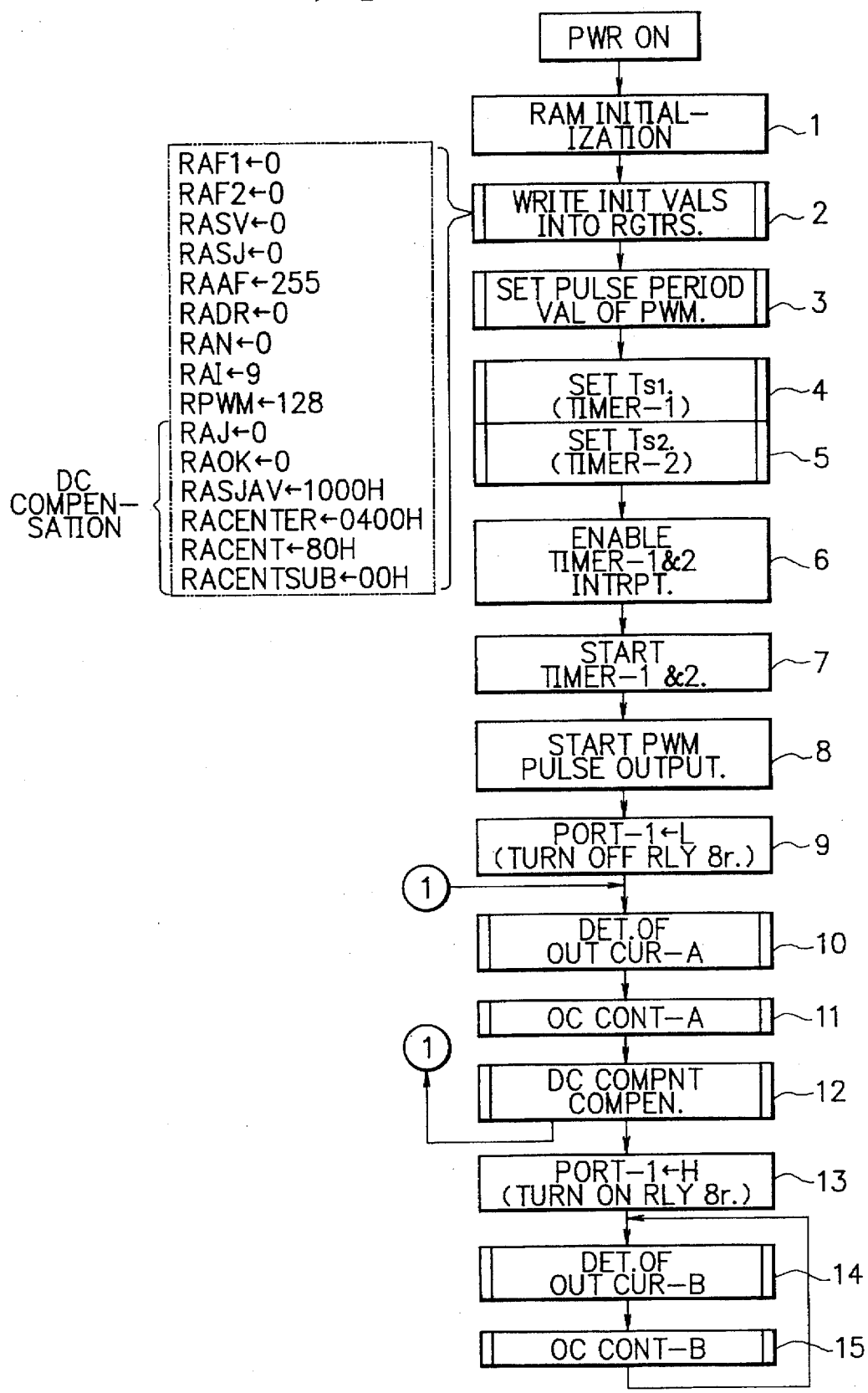
FIG. 3 is a flow chart showing an outline (main routine) of the control operation of the microcomputer 22 in FIG. 2A.

FIG. 3 shows an outline of the power control operation of the computer 22 in FIG. 2A.

(1) Initialization of Internal RAM

When the power supply is turned on, the computer 22 initializes the internal RAM for temporarily storing data (step 1).

(2) Setting of Initial Value in Register

The computer 22 then sets initial values in predetermined registers of the registers assigned to the internal RAM (writing: step 2). FIG. 3 shows examples of the registers and initial values written therein.

A register RAF1 is a flag register for storing data (0: positive half cycle interval/1: negative half cycle interval) indicating whether the current time belongs to a positive half cycle interval [0 to 180*(95/96)] or a negative half cycle interval [180 to 180+180*(95/96)] of an AC output voltage (50 Hz). The initial value to be stored in this register is 0. Note that one unit (180°/96) obtained by dividing one cycle by 192 (=96×2) is set as a repetitive calculation cycle (execution cycle of timer-1 interrupt processing IRT1 to be described later: update cycle of Vpwm) for output voltage control for updating of H interval data Vpwm of PWM pulse, and zero-crossing points (0° and 180°) are respectively set as the start points of positive and negative half cycle intervals of the AC output voltage (50 Hz).

A register RAF2 is a flag register for storing data (0: no overcurrent control/1: overcurrent control in operation) indicating whether overcurrent control for suppressing an overcurrent of an AC output current (50 Hz) is in operation. The initial value to be stored in this register is 0.

A register RASV is a voltage integration register for calculating the integrated value of output voltages in the respective half cycle intervals of an AC output voltage (50 Hz). The initial value to be stored in this register is 0.

A register RASJ is an integration register for calculating the mean output current value of an AC output current (50 Hz). The initial value to be stored in this register is 0. A sampling/integration interval for a mean output current value is an interval ½ one cycle of an AC output current (50 Hz). At the end of this interval, a mean value is calculated, and a new current value sampling/integrating operation is started.

A register RAAF is a register for storing an adjustment value for overcurrent control. A value from 0 to 255 is stored in this register, and a first reference voltage (sine wave) Vref1(N) for generating a reference AC voltage is multiplied by RAAF/256, thereby adjusting an output voltage. "RAAF" of RAAF/256 indicates the data stored in the register RAAF. The initial value to be stored in the register RAAF is 255.

A register RADR is a register for storing an adjustment value for setting an AC output voltage (50 Hz) as a set value. A second reference voltage (sine wave) Vref2(N) for generating a reference AC voltage is multiplied by RADR/256 to adjust an output voltage. "RADR" of RADR/256 indicates the data stored in the register RADR. The initial value to be stored in the register RADR is 0.

A register RAN is a phase count register. When this register counts up to 95 (at the end of the half wave period), with one unit obtained by dividing one cycle by 96×2 being set as one unit for a phase counting operation, the value in the register is initialized. The initial value to be stored in the register is 0.

A register RAI is an integration count register for calculating a mean output current value of an AC output currents (50 Hz). The initial value to be stored in this register is 9. An interval for mean output current value sampling/integrating (the interval in which the data in the register RAI changes from 1 to 16) corresponds to ½ one cycle of an AC output current (50 Hz). At the end of this interval, the mean AC current value Jav=RASJ16 ("RASJ" indicates the data in the integration register RASJ described above, and "16" indicates the data in the integration count register RAI) is calculated, and a new current value sampling/integrating operation is started.

The initial value to be stored in the register RAI is set to be 9 for the following reason. In a non-load state, only the step-up transformer having no load connected to its secondary winding and the current detection transformer 5, i.e., only inductor parts, are connected between the output terminals 4a and 4b. For this reason, an output AC voltage and an output AC current have a phase difference of about 90°. The above initial value is set to cancel this phase difference and perform integration while discriminating the positive and negative half waves of the output AC current from each other. The significance of this initial value will be described in more detail later in the description of "DC component compensation" (step 12).

A register RPWM is a PWM output register for storing data Vpwm for setting the H (high-level) width of a PWM pulse to be output. The initial value of data Vpwm to be stored in the register RPWM is 128 (the duty ratio of the PWM pulse: 50%).

A register RASJAV is a DC component integration register for storing the integrated value of the DC components of the mean AC current values Jav during five cycles of an AC output current (50 Hz) (the integrated value of DC components contained in 10 sampled values of the mean AC current value). In order to remove AC components, integration is performed such that the mean AC current values Jav in the range of 90° to 270° of an AC output current (50 Hz) are regarded as positive values, and the mean AC current values Jav in the range of 270° to 0° to 90° are regarded as negative values. Integral data RASJAV of the values in the register RASJAV during five cycles of an AC output current (50 Hz) indicates a mean DC component value during five cycles. The initial value to be stored in the register RASJAV is 1000H ("H" is the hexadecimal notation).

A register RAJ is an integration count register for integration of DC components. The initial value to be stored in this register is 0.

A register RAOK is a count register for storing the number of times DC components consecutively fall within a proper value range in DC component detection cycles. The initial value to be stored in this register is 0.

A register RACENTER is a register for storing an adjustment value for DC component adjustment. The initial value to be stored in this register is 0400H.

A register RACENT is a register for storing an integer or ⅛ the data stored in the register RACENTER. The initial value to be stored in this register is 80H.

A register RACENTSUB is a register for storing data corresponding to the decimal fraction of ⅛ the data stored in the register RACENTER. The initial value to be stored in this register is 00H.

Other those described above, various registers (assigned to the internal RAM) and various data tables (assigned to the internal ROM) are used. These registers and tables will be described in the description of the operation of the computer 22 on the basis of the following flow charts.

(3) Setting of PWM Pulse Period Tpwm

The computer 22 writes a period Tpwm=255/f≈34.59 μsec of a PWM pulse, which is to be output from its output port PWM to the pulse inverter 23, in the register Tpwm (step 3). Reference symbol f denotes the frequency of a clock pulse generated by the oscillator 20. In the first embodiment, the frequency of an AC voltage to be applied to the load LD is set to 50 Hz.

(4) Setting of Interrupt Cycle Ts1 of Timer Interrupt 1

A time limit value Ts1=1/9.6 kHz≈104.17 μsec of timer 1 is written in the register Ts1 (step 4).

(5) Setting of Interrupt Cycle Ts2 of Timer Interrupt 2

A time limit value Ts2=6/9.6 kHz≈625 μsec of timer 2 is written in the register Ts2 (step 5).

(6) Enabling of Timer Interrupt

The computer 22 enables timer-1 interrupt processing and timer-2 interrupt processing in response to timeouts of timer 1 and timer 2 (step 6). With this operation, subsequently, "timer-1 interrupt processing" (IRT1) shown in FIGS. 8 to 12 is executed every time a timeout of timer 1 occurs, and "timer-2 interrupt processing" (IRT2) shown in FIG. 4 is performed every time a timeout of timer 2 occurs.

Since the time limit values Ts1 and Ts2 are respectively set in timer 1 and timer 2, "timer-1 interrupt processing" (IRT1) is executed in a cycle of Ts1, and "timer-2 interrupt processing" (IRT2) is executed in a cycle of Ts2.

Since Ts2=Ts1×6, "timer-2 interrupt processing" (IRT2) is executed once for every six times of execution of "timer-1 interrupt processing" (IRT1). The contents of "timer-1 interrupt processing" (IRT1) will be described later with reference to FIGS. 8 to 12, and the contents of "timer-2 interrupt processing" (IRT2) will be described later with reference to FIG. 4.

(7) Timer Start

The time limit value Ts1 (data in the register Ts1) is set in timer 1, and the time limit value Ts2 (data in the register Ts2) is set in timer 2. The respective timers are then started (step 7).

(8) Start of Output of PWM Pulse

The computer 22 sets the output port PWM at high (H) level, starts an interrupt timer Vpwm in which a time limit value Vpwm (data in the register Vpwm) is set, and enables "PWM interrupt processing" (step 8).

Subsequently, a PWM pulse output operation is performed in "PWM interrupt processing" (interrupt processing for a PWM output operation) (not shown) by the computer 22. A PWM period Tpwm is the value set in the register Tpwm in step 3, i.e., 255/f≈34.59 μsec. The periods Vpwm and Tpwm are measured by time count operation counting output pulses (frequency f) from the oscillator 20 (clock pulse count operation). In this interrupt processing, the timer Vpwm for counting the period Vpwm is started, and the output port PWM is set at high (H) level. When a timeout of the timer Vpwm occurs, the output port PWM is set at low (L) level, and a timer (Tpwm−Vpwm) for counting a period of Tpwm−Vpwm is started. When a timeout of this timer (Tpwm−Vpwm) occurs, the timer Vpwm for counting the period Vpwm is started, and the output port PWM is set at high (H) level. Subsequently, a similar operation is performed. In this interrupt processing, the period Vpwm is updated with the data in the register RPWM (to be described later) in a cycle of Ts1. At this time, the period Vpwm is given by $$Vpwm=RPWM/255*Tpwm$$

where RPWM is the data in the register RPWM. For example, the duty ratio of a pulse output from the output port PWM when RPWM=128 is almost 50%. With this "PWM interrupt processing", a PWM pulse is output from the output port PWM to the pulse inverter 23.

Figure 12:
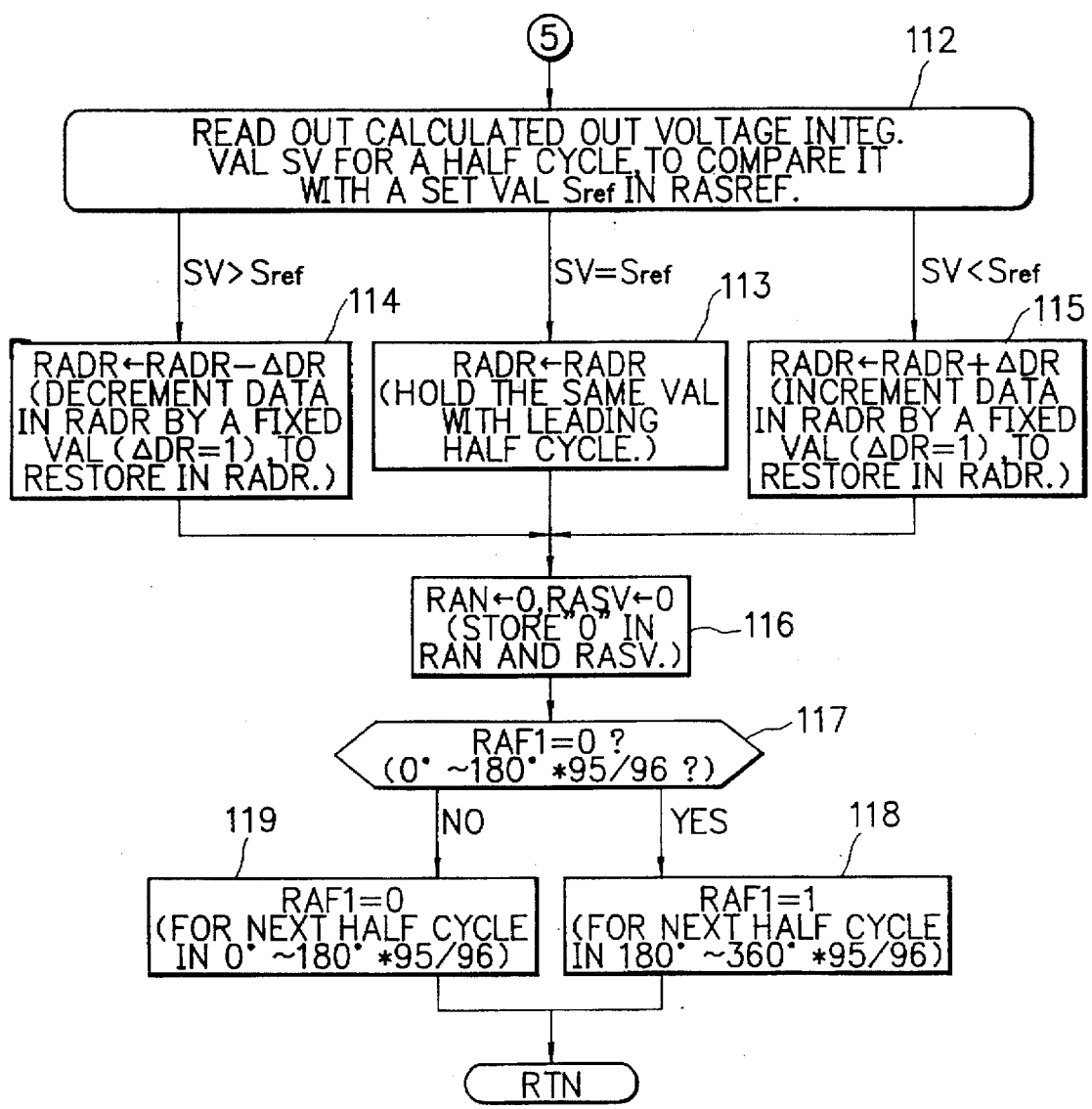
FIG. 12 is a flow chart showing the remaining part of the contents of "timer-1 interrupt processing" (IRT1) performed by the microcomputer 22 in FIG. 2A.
Figure 13:
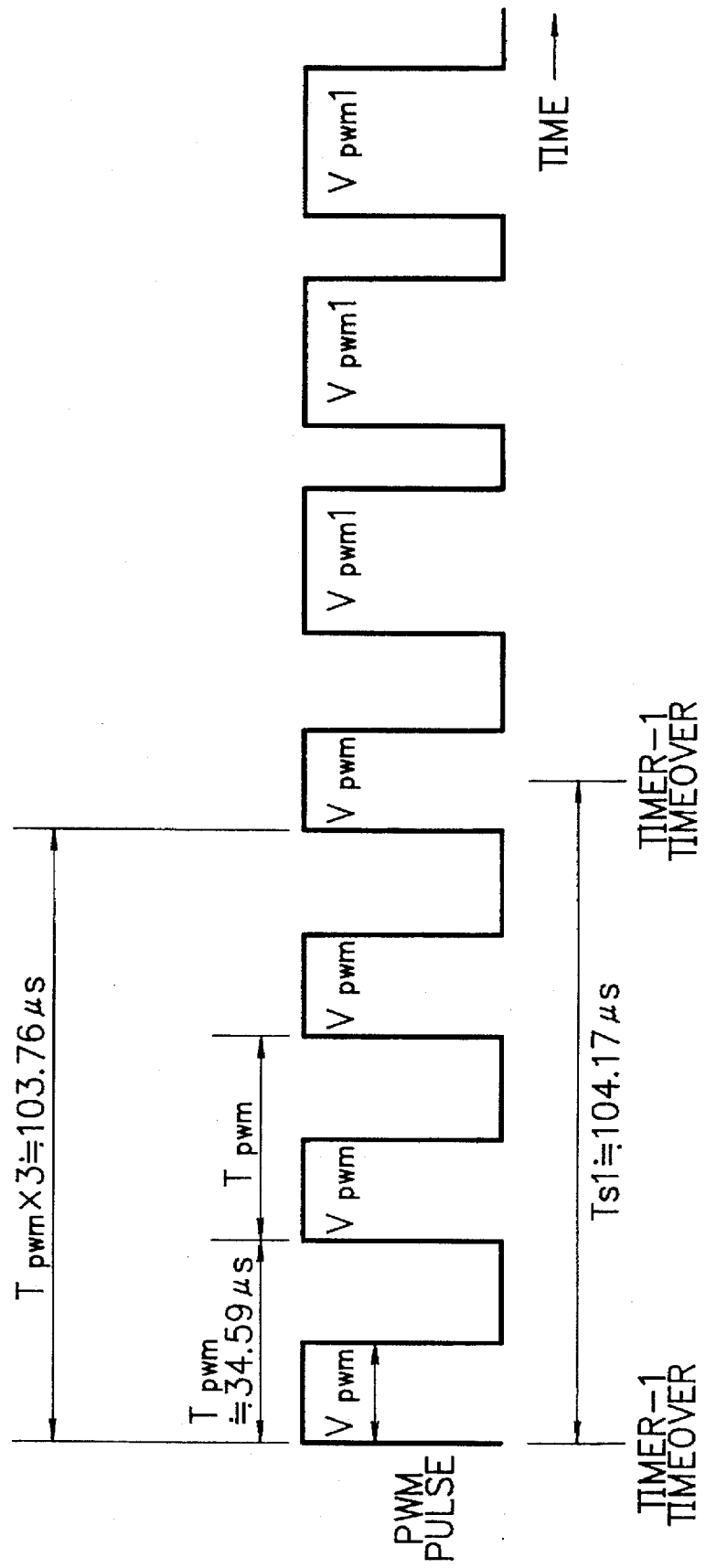
FIG. 13 is a timing chart showing a PWM pulse generated by the microcomputer 22 in FIG. 2A.

FIG. 13 shows a PWM pulse. Ts1≈104.17 μsec, Tpwm≈34.59 μsec, and the period Vpwm is updated in a cycle of Ts1. For this reason, PWM pulses having the same ON (H) width are output during a three-pulse (three-cycle) or four-pulse period of PWM pulses. That is, once a pulse ON (H) width Vpwm is calculated within the period Ts1, and the contents of the register RPWM are updated, pulses having a fixed PWM period and the same ON width are output. As will be described later, in "timer-1 interrupt processing" (IRT1: FIGS. 8 to 12) executed in a cycle of Ts1, various arithmetic operations for overcurrent suppression, DC component suppression and output voltage control are performed. These arithmetic operations require a relatively long period of time. For this reason, the period Ts1 is set to be longer than the PWM pulse period Tpwm.

(9) Interruption of Output to Load LD

At the same time when a PWM pulse is output, the computer 22 sets the output port 1 at L(low)-level (step 9). The resultant L-level signal is inverted into an H(high)-level signal by the buffer amplifier BA1 and supplied to the relay drive circuit 8d. In response to this H-level signal, the relay drive circuit 8d de-energizes (interrupt power) the relay 8r. The relay contact is opened (the relay contact is open during a power OFF period, and is also substantially kept open up to this process after the power supply is turned on).

(10) "Detection of Output Current-A" (step 10)

In this step, an instantaneous value (absolute value) of an output current (50 Hz) detected by the current detection transformer 5 is read, and the mean AC current value Jav is calculated (step 10). The contents of this step will be described later with reference to FIG. 5.

(11) "Overcurrent Control-A" (step 11)

In this step, the computer 22 checks whether an output current (50 Hz) falls within a set range. If the output current goes outside the set range, the computer 22 updates the adjustment value to make the output current fall within the set range (step 11). The contents of this step will be described later with reference to FIG. 6.

(12) "DC Component Compensation" (step 12)

In this step, the computer 22 detects the DC component of an output current (50 Hz), and checks whether the detected component falls within a proper value range. If the DC component exceeds outside the range, the computer 22 updates the adjustment value to make the DC component fall within the range (step 12). Steps 10 to 12 are repeated until the DC component falls within the proper value range.

When the DC component falls within the proper value range, the flow advances to step 13. The contents of "DC component compensation" will be described with reference to FIG. 7.

(13) Start of Power Supply to Load LD

The computer 22 sets the output port 1 at H(high)-level (step 13). The resultant H-level signal is inverted into an L(low)-level signal by the buffer amplifier BA1 and supplied to the relay drive circuit 8d. In response to this L-level signal, the relay drive circuit 8d energizes the relay 8r. The relay contact is closed. With this operation, an AC output voltage (50 Hz) from the inverter shown in FIG. 1 is applied to the load LD.

(14) "Detection of Output Current-B" (step 14)

The processing executed by the computer 22 in this step is equivalent to "detection of output current-A" (step 10). A detailed description of the contents of this step will therefore be omitted.

(15) "Overcurrent Control-B" (step 15)

The processing executed by the computer 22 in this step is equivalent to "overcurrent control-A" (step 11). A detailed description of the contents of this step will therefore be omitted.

After the relay 8r is energized (while power is supplied to the load), the computer 22 repeatedly executes only "detection of output current-B" (step 14) and "overcurrent control-B" (step 15) in this order until the power supply is turned off, or the reset switch 21 is turned on. When the reset switch 21 is turned on, the computer 22 stops the operation. When the reset switch 21 is turned off, the computer 22 resumes the above operation from step 1.

The processing from step 1 to step 12 is preparatory processing (pre-processing) for supplying power to the load LD. Steps 10 to 12 are repeated until an output DC component during a non-load period is suppressed within a proper range. When the DC component is suppressed within the proper range, the computer 22 starts to supply power to the load LD (to turn on the relay 8r). Thereafter, control of power supplied to the load is performed by executing only "detection of output current-B" (step 14) and "overcurrent control-B" (step 15).

The contents of "timer-2 interrupt processing" (IRT2) will be described with reference to FIG. 4. In response to a timeout of timer 2, the computer 22 sets the time limit value Ts2 (data in the register Ts2) in timer 2 again, and restarts timer 2 (step 21). The computer 22 writes "1" indicating the necessity of execution of "detection of output current" in the register IRF2 (step 22). The computer 22 then completes "timer-2 interrupt processing" (IRT2), and the flow returns to the main routine, to the processing executed immediately before the flow advanced to this interrupt processing.

The contents of "detection of output current-A" (step 10) will be described with reference to FIG. 5. First of all, the computer 22 checks whether "1" (indicating the necessity of execution of "detection of output current") is set in the register IRF2 (step 31). If "1" is not set, the computer 22 waits until the data in the register IRF2 becomes "1". That is, the computer 22 waits for the detection (sampling) timing of an output current. If the data in the register IRF2 is "1" or becomes "1", the computer 22 clears the data in the register IRF2 (equivalent to writing of "0") (step 32), and waits until digital conversion of the input voltage (the instantaneous value of a 50-Hz output current; absolute value) to the second A/D conversion input port A/D2 is completed (step 33). This digital conversion has been started in step 106 (FIG. 10) in "timer-1 interrupt processing" (IRT1: FIGS. 8 to 12) to be described later (A/D conversion of a detected current value is performed in a cycle of Ts1).

Referring to FIG. 5 again, upon completion of this digital conversion (step 33), the computer 22 writes the detected current value (data) Jout in the register RAJOUT (step 34). That is, the computer 22 writes the latest detected current value in the register RAJOUT.

Subsequently, the computer 22 writes the sum of the contents of the integration register RASJ and the value Jout in the integration register RASJ (step 35). That is, the computer 22 adds up the currently read detected current value Jout to the value stored in the register RASJ. Since the integrated value becomes large, two bytes are assigned to the register RASJ to express the value.

The computer 22 checks whether the data RAI in the integration count register RAI represents "16" (integration is performed 16 times) (step 36). If the data is not "16", the computer 22 increments the data RAI in the integration count register RAI by one (step 37), and waits until the data in the register IRF2 becomes "1" (step 31). That is, the computer 22 waits for the next current value sampling timing. As described above, since the data in the register IRF2 becomes "1" upon completion of "timer-2 interrupt processing" (IRT2), the sampling period of an output current is Ts2. In this case, the computer 22 waits for the lapse of the period Ts2. Upon performing current value reading and integrating operations 16 times (a total time of 16×Ts2), the computer 22 calculates a mean current value Jav=RASJ/16, and writes it in the register Jav (step 38). The computer 22 then initializes the data RAI in the integration count register RAI (step 39), and initializes the data in the integration register RASJ to 0 (step 40).

That is, since the detected output current value Jout is read 16 times in a cycle of Ts2, and the mean value Jav is calculated during a period of Ts2×16 in "detection of output current-A" (step 10), the mean current value Jav (data Jav in the register Jav) is updated in a cycle of Ts2×16. Since the flow advances to "overcurrent control-A" (step 11) every time this mean current value is updated, "overcurrent control-A" (step 11) is executed in a cycle of Ts2×16.

The above description regards the contents of "detection of output current-A" (step 10). "Detection of output current-A" (step 10) is executed in a cycle of Ts2×16. Note that the contents of "detection of output current-B" (step 14) after supply of power to the load LD is started are equivalent to those of "detection of output current-A" (step 10). That is, the above "detection of output current" processing is executed in a cycle of Ts2×16 before and after supply of power to the load LD is started.

Figure 6:
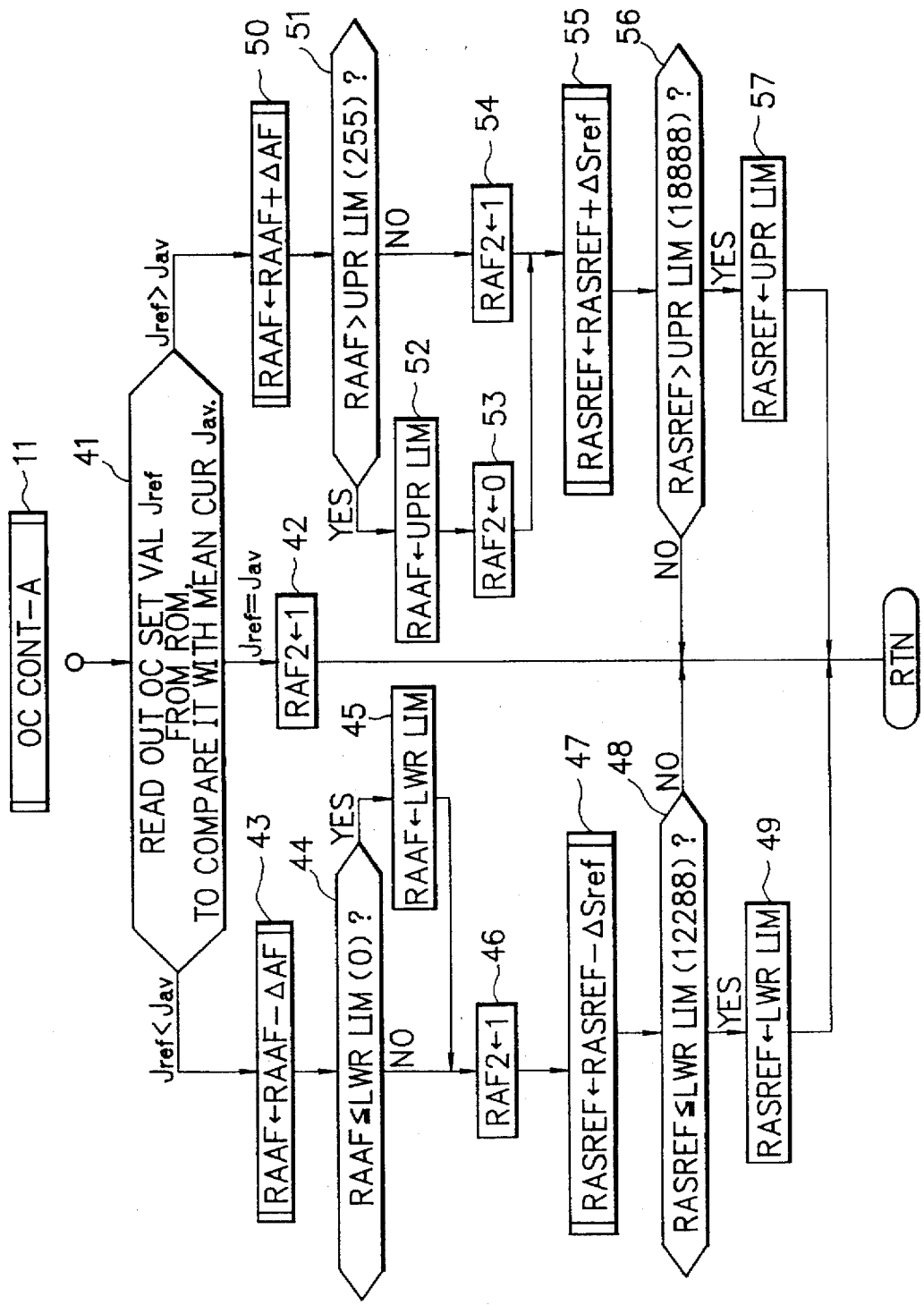
FIG. 6 is a flow chart showing the contents of "overcurrent control-A" (step 11) in FIG. 3.

The contents of "overcurrent control-A" (step 11) will be described with reference to FIG. 6. In this case, the computer 22 reads out the overcurrent set value Jref from the internal ROM, compares the mean current value Jav with the overcurrent set value Jref to check whether Jref=Jav, Jref<Jav, or Jref>Jav (step 41).

If Jref<Jav, the computer 22 updates the value in the register RAAF (initial value: 255), in which the first adjustment value RAAF for adjusting an output current value is stored, into a value smaller than the original value by one unit value ΔAF of the first adjustment value (step 45). This update processing is equivalent to updating of the data RAAF in the register RAAF into data representing the difference obtained by subtracting "1" from the numerical value represented by the data RAAF (decrement of the data by one). The computer 22 then checks whether the updated value is equal to or smaller than a lower limit (0). If it is determined that the updated value is equal to or smaller than the lower limit (0), the computer 22 changes the value to the lower limit (0) (steps 44 and 45). That is, the data in the register RAAF is fixed to this lower limit (0).

Since current value adjustment (decrease) is required, "1" indicating this necessity is written in the register RAF2 (step 46). Note that the data in the register RAF2 will be referred to in "timer-1 interrupt processing" (IRT1) to be described later.

Figure 14A:
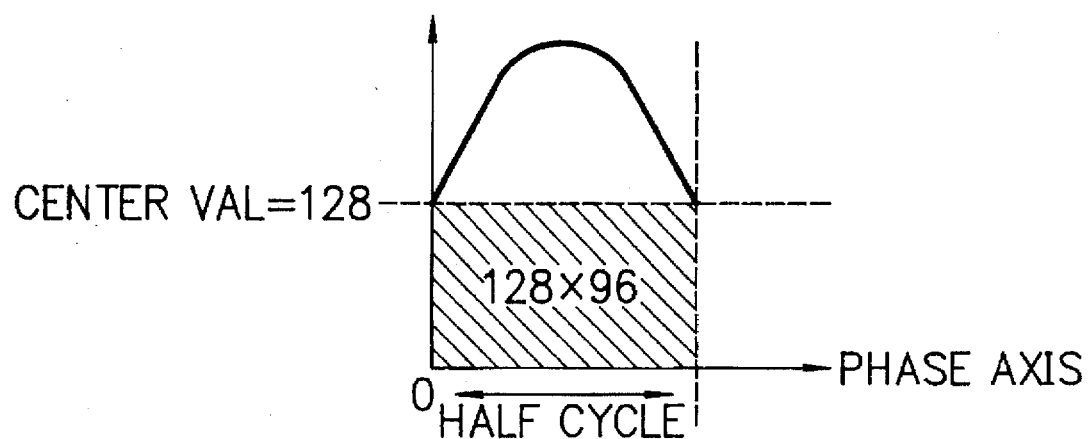
FIGS. 14A and 14B are graphs showing waveforms indicating the relationship between the lower and upper limits of data RASREF set by the microcomputer 22 in "overcurrent control-A" (step 11) in FIG. 6 and the AC output voltage levels (voltage waveforms), in which the area indicated by the line obliquely descending to the right in FIG. 14A corresponds to the lower limit, and the area indicated by the line obliquely descending to the right in FIG. 14B corresponds to the upper limit.

Subsequently, the computer 22 updates the value in the register RASREF, in which the second adjustment value RASREF for adjusting an output current is stored, into a value smaller than the original value by one unit ΔSref of the second adjustment value (step 47). This update processing is equivalent to updating of the data RASREF in the register RASREF into data representing the difference obtained by subtracting "32" from the numerical value representing the data RASREF. The computer 22 then checks whether the updated value is equal to or smaller than a lower limit (12288). If it is determined that the updated value is equal to or smaller than the lower limit (12288), the computer 22 changes the value to the lower limit (12288) (steps 48 and 49). That is, the data in the register RASREF is fixed to the lower limit (12288). This lower limit corresponds to the area of the hatched region in FIG. 14A. That is, the lower limit (12288) is the area (128×96) enclosed with the center value (128) and phase axis of a sine wave within a half cycle range.

Figure 14B:
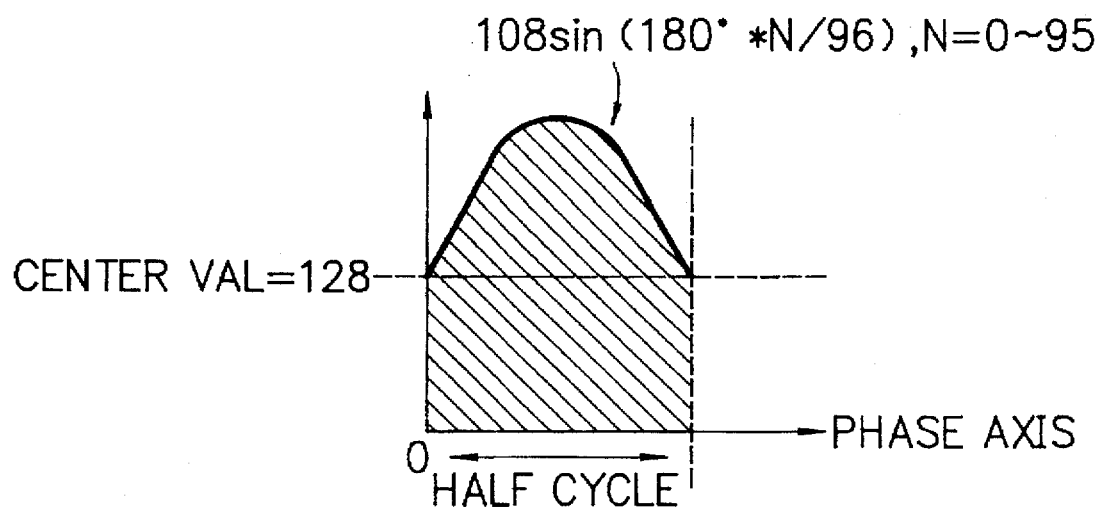

The computer 22 compares the mean current value Jav with the overcurrent set value Jref (step 41). If Jref>Jav, the computer 22 updates the value in the register RAAF, in which the first adjustment value RAAF for adjusting an output current value is stored, into a value larger than the original value by one unit ΔAF of the first adjustment value (step 50). This update processing is equivalent to updating of the data RAAF in the register RAAF into data representing the sum of the numerical value represented by the data RAAF and "1" (increment of the data by one). The computer 22 then checks whether the updated value exceeds an upper limit (255). If it is determined that the updated value exceeds the upper limit (255), the computer 22 changes the value to the upper limit (255) (steps 51 and 52). That is, the data in the register RAAF is fixed to the upper limit (255). If the updated value exceeds the upper limit, since adjustment (increase) of the current value cannot be performed, "0" indicating that current value adjustment is not necessary (impossible to adjust) is written in the register RFA2 (step 53). If the updated value does not exceed the upper limit, "1" indicating that current value adjustment is necessary is written in the register RAF2 (step 54). The computer 22 then updates the value in the register RASREF, in which the second adjustment value RASREF for adjusting an output current value is stored, into a value larger than the original value by one unit ΔSref of the second adjustment value (step 55). The computer 22 checks whether the updated value exceeds an upper limit (18888). If it is determined that the updated value exceeds the upper limit (18888), the computer 22 changes the updated value to the upper limit (18888) (steps 56 and 57). That is, the data in the register RASREF is fixed to the upper limit (18888). This upper limit corresponds to the area of the hatched region in FIG. 14B. Note that the upper limit (18888) indicates the area (hatched portion) enclosed with the curve represented by (108 sin (180° *N/96)+128, N=0 to 95) and the phase axis within a half cycle range. This upper limit is a set value for controlling an output voltage from the inverter to become a root-mean-square value of 100 V.

The computer 22 compares the mean current value Jav with the overcurrent set value Jref (step 41). If Jref=Jav, the computer 22 writes "1" indicating the necessity of current value adjustment in the register RAF2 without changing the first and second adjustment values RAAF and RASREF (i.e., maintaining the previous values) (step 42).

The above description regards about "overcurrent control-A" (step 11). This "overcurrent control-A" processing (step 11) is executed in a cycle of Ts2×16. Note that the contents of "overcurrent control-B" (step 15) after supply of power to the load LD is started are equivalent to those of "overcurrent control-A" (step 11). That is, the above overcurrent control is executed in a cycle of Ts2×16 before and after supply of power to the load LD is started.

The contents of "DC component compensation" (step 12) will be described with reference to FIG. 7. Note that "DC component compensation" (step 12) is repeatedly executed in a cycle of Ts2×16=10,000 μsec (½ the period 20,000 μsec of a 50-Hz output AC voltage) only before supply of power to the load LD is started. In addition, only when generation of a 50-Hz output AC voltage is started (step 8 in FIG. 3), since the initial value in the register RAI is "9", the first "DC component compensation" processing (step 12) is executed after a lapse of 5,000 μsec (when the phase of the first wave of the AC voltage is 90°. Subsequently, this processing is repeatedly executed in a cycle of Ts2×16=10,000 μsec.

According to the above description, only when generation of a 50-Hz output AC voltage is started, the first "DC component compensation" processing (step 12) is executed after a lapse of Ts2×8=5,000 μsec, which is ½ the normal cycle. In a non-load state, only the step-up transformer having no load connected to its secondary winding and the current detection transformer 5, i.e., only inductor elements, are connected between the output terminals 4a and 4b. For this reason, an output AC voltage and an output AC current have a phase difference of about 90°. As will be described later, in order to perform DC component compensation processing while discriminating positive and negative half cycle waves of an output AC current, the start point of "DC component compensation" (step 12) must be delayed by 90° with respect to a 50-Hz output voltage waveform. For this reason, the execution timing of the first "DC component compensation" processing (step 12) must be shifted by 90° (5,000 μsec) by setting "9" as the initial value to be stored in the register RAI.

In "DC component compensation" (step 12), first of all, the computer 22 increments data RAJ (initial value: 0) in the integration count register RAJ (step 61). The computer 22 then checks whether the resultant value is an even number (step 62). If it is determined that the value is an even number, the computer 22 writes the sum of the data Jav in the register Jav and the data RASJAV in the integration register RAS-JAV to update into the integration register RASJAV (step 63). Two bytes are assigned to the data RASJAV. If the data RAJ in the integration count register RAJ is an odd number, the computer 22 writes the value obtained by subtracting the data Jav in the register Jav from the data RASJAV in the integration register RASJAV to update into the integration register RASJAV (step 64). The computer 22 then checks whether the data RAJ in the integration count register RAJ becomes "10" (integration is performed 10 times) (step 65). If it is determined that the data has not reached "10", the computer 22 terminates "DC component compensation" (step 12), and the flow advances to "detection of output current-A" (step 10).

When the data in the integration count register RAJ becomes "10", the computer 22 have added up the mean value (Jav1) of the rectified values (absolute values) of output currents between a phase of 270° of the first wave and a phase of 90° of the second wave of a 50-Hz AC voltage output (no load), as a negative (–) value, to the data in the register RASJAV; the mean value (Jav2) of output currents between phases of 90° and 270° of the second wave of a 50-Hz AC voltage output (no load), as a positive (+) value, to the data in the register RASJAV; and the means value (Jav3) of output currents between phases of 270° and 90° of the second wave of a 50-Hz AC voltage output (no load), as a negative (–) value, to the data in the register RASJAV. Similarly, mean values Jav4, Jav5, Jav6, Jav7, Jav8, and Jav9 and the means value (Jav10) of output currents between phases of 90° and 270° of the fifth wave, as positive values, have been added to the data in the register RASJAV.

In the first "DC component compensation" processing (step 12) immediately after the inverter circuit is started, since "9" is set as an initial value in the register RAI to match the phase of a current with that of a voltage, the integral data (Jav1) obtained when the data in the register RAJ is "1" is the mean value of the rectified values (absolute values) of output currents between phases of 0° and 90° of the second wave of a 50-Hz AC voltage output (no load).

Assume that there is a DC component. In this case, if the component has a positive level (the polarity that increases the positive half cycle peak of the first wave), the value represented by the data in the register RASJAV is a large positive value. If the component has a negative level (the polarity that decreases the half cycle peak of the first wave), the value represented by the data in the register RASJAV is a small positive value (because the initial value in the register RASJAV is "1000H").

When the data RAJ in the integration count register RAJ becomes "10", the computer 22 detects this in step 65, and clears the integration count register RAJ (step 66). The computer 22 then checks whether the DC component (the data RASJAV in the register RASJAV) falls within the set range (proper value range), i.e., equal to or smaller than the data SJAVMAX (the data in the register SJAVMAX which is a fixed value representing "100AH") and equal to or larger than the data SJAVMIN (the data in the register SJAVMIN which is a fixed value representing "0FFH"), i.e., SJAVMAX≧RASJAV≧SJAVMIN (steps 67 and 69). If the data RASJAV (the DC component) is above the set range (the DC component has the polarity that increases the half cycle peak of a 50-Hz AC non-load output current), the DC component adjustment value RACENTER (the data in the register RACENTER) is decremented by one (step 68). If the data RASJAV is below the set range (the DC component has the polarity that decreases the half cycle peak of a 50-Hz AC non-load output current), the DC component adjustment value RACENTER is incremented by one (step 70).

Figure 15:
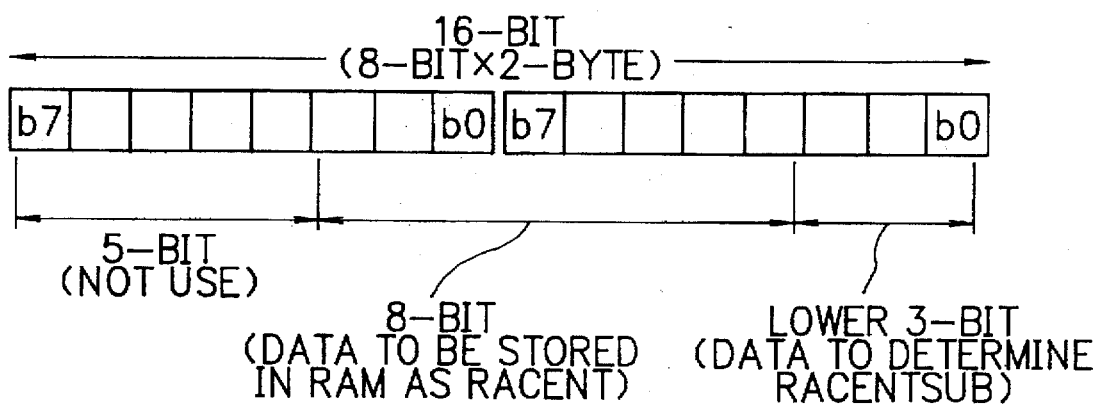
FIG. 15 is a data constitution showing the bit configuration of data RACENTER set by the microcomputer 22 in "DC component compensation" (step 12) in FIG. 7.
Figure 16:
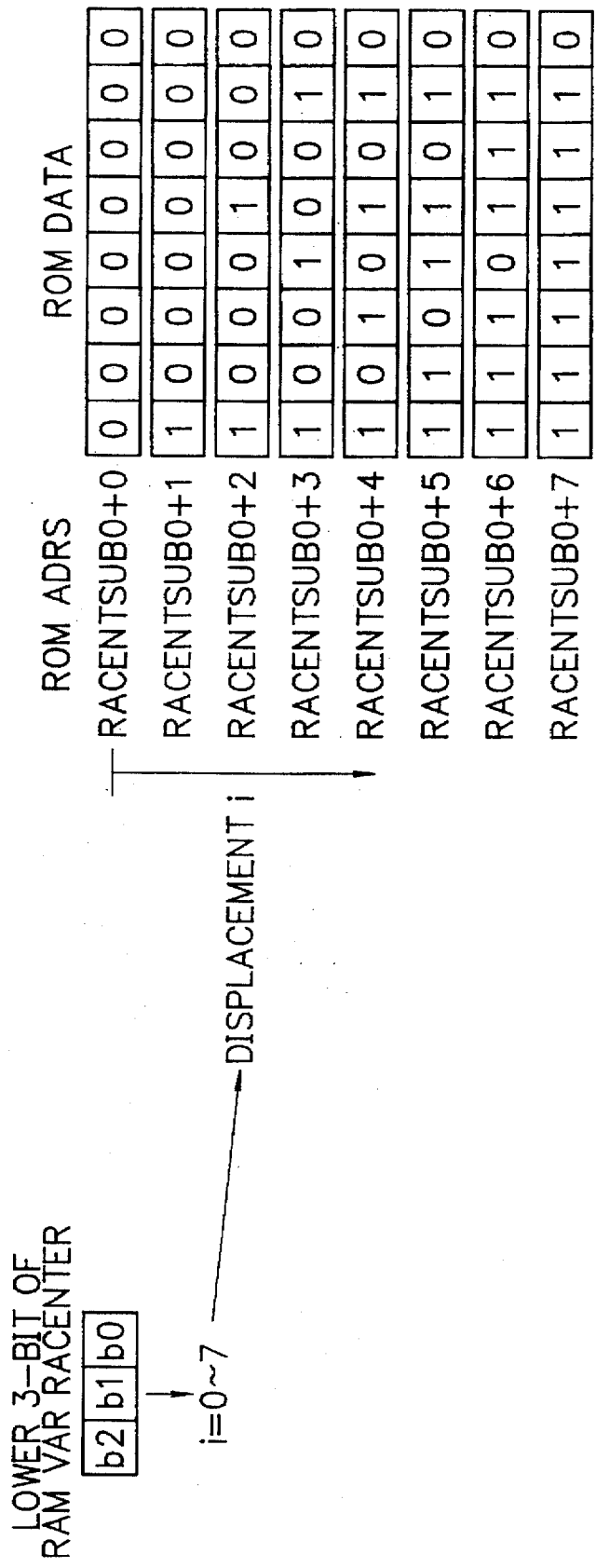
FIG. 16 is a data constitution showing data RACENTSUB (eight sets) set by the microcomputer 22 in "DC component compensation" (step 12) in FIG. 7.

When the DC component adjustment value RACENTER is updated in this manner, "0" indicating that adjustment is in progress is written in the register RAOK (step 71), and the integration register RASJAV is initialized. That is, the initial value "1000H" is written in the integration register RASJAV (step 74). The microcomputer 22 then picks up the lower 3 bits representing a numerical value i (i=0 to 7) from the 2-byte data RACENTER (FIG. 15 shows its data constitution) stored in the register RACENTER, reads out 8-bit data (shown in FIG. 16) corresponding to the numerical value i (i=0 to 7) from the internal ROM, and writes the data in the register RACENTSUB (step 76). That is, the microcomputer 22 reads out data from the ROM at address RACENTSUB0+i in accordance with the lower 3 bits of the data RACENTER as a displacement i, and stores the data in the register RACENTSUB. Data containing "1"s at ratios of ⁰⁄₈, ⅛, ..., ⅞ of RACENTSUB0 are stored in the ROM in advance.

When, therefore, the picked 3 bits represent i=0, "00000000" (indicating a fraction "⁰⁄₈" in consideration of processing to be described later) is written in the register RACENTSUB (step 76). Similarly, the following data are written in this register: "10000000" (indicating a fraction "⅛") when i=1; "10001000" (indicating a fraction "²⁄₈") when i=2; "10010010" (indicating a fraction "³⁄₈") when i=3; "10101010" (indicating a fraction "⁴⁄₈") when i=4; "11011010" (indicating a fraction "⁵⁄₈") when i=5; "11101110" (indicating a fraction "⁶⁄₈") when i=6; and "11111110" (indicating a fraction "⅞") when i=7.

Subsequently, the microcomputer 22 picks up 8-bit data (the integer of data representing ⅛ of the data RACENTER) including the lower 4th bit to 11th bit of the 2-byte data RACENTER in the register RACENTER (i.e., divides the data RACENTER by 8), and writes the resultant data in the register RACENT (step 78). In brief, in the above processing in steps 75 to 78, the microcomputer 22 performs division to obtain ⅛ of the data RACENTER in the register RACENTER, writes the resultant integer in the register RACENT, and writes data corresponding to the fraction in the register RACENTSUB.

When the above processing in steps 65 and 66 to 78 is executed, "detection of output current-A" (step 10) and "overcurrent control-A" (step 11) are executed, and "DC component compensation" (step 12) is executed again. As described above, these three types of processing are repeated in a cycle of Ts2×16≈1,000 μsec in the order named. However, "timer-1 interrupt processing" (IRT1) (to be described later) is repeated at a short cycle of Ts1≈104.17 μsec. In this "timer-1 interrupt processing" (IRT1), the H width Vpwm of a PWM pulse is determined on the basis of the adjustment values (RAAF and RASREF) set in "overcurrent control-A" (step 11) and the adjustment values (RACENT and RACENTSUB) set in "DC component compensation" (step 12). In the above PWM interrupt processing, a PWM pulse having this set H width Vpwm is generated and output to the pulse inverter 23. For this reason, as described above, by changing the adjustment values (RACENT and RACENTSUB) in "DC component compensation" (step 12), the value of a 50-Hz non-load AC output current is changed. By repeating "DC component compensation" (step 12), the DC component RASJAV changes in a direction to fall within the proper value range (equal to or smaller than SJAVMAX and equal to or larger than SJAVMIN).

Figure 7:
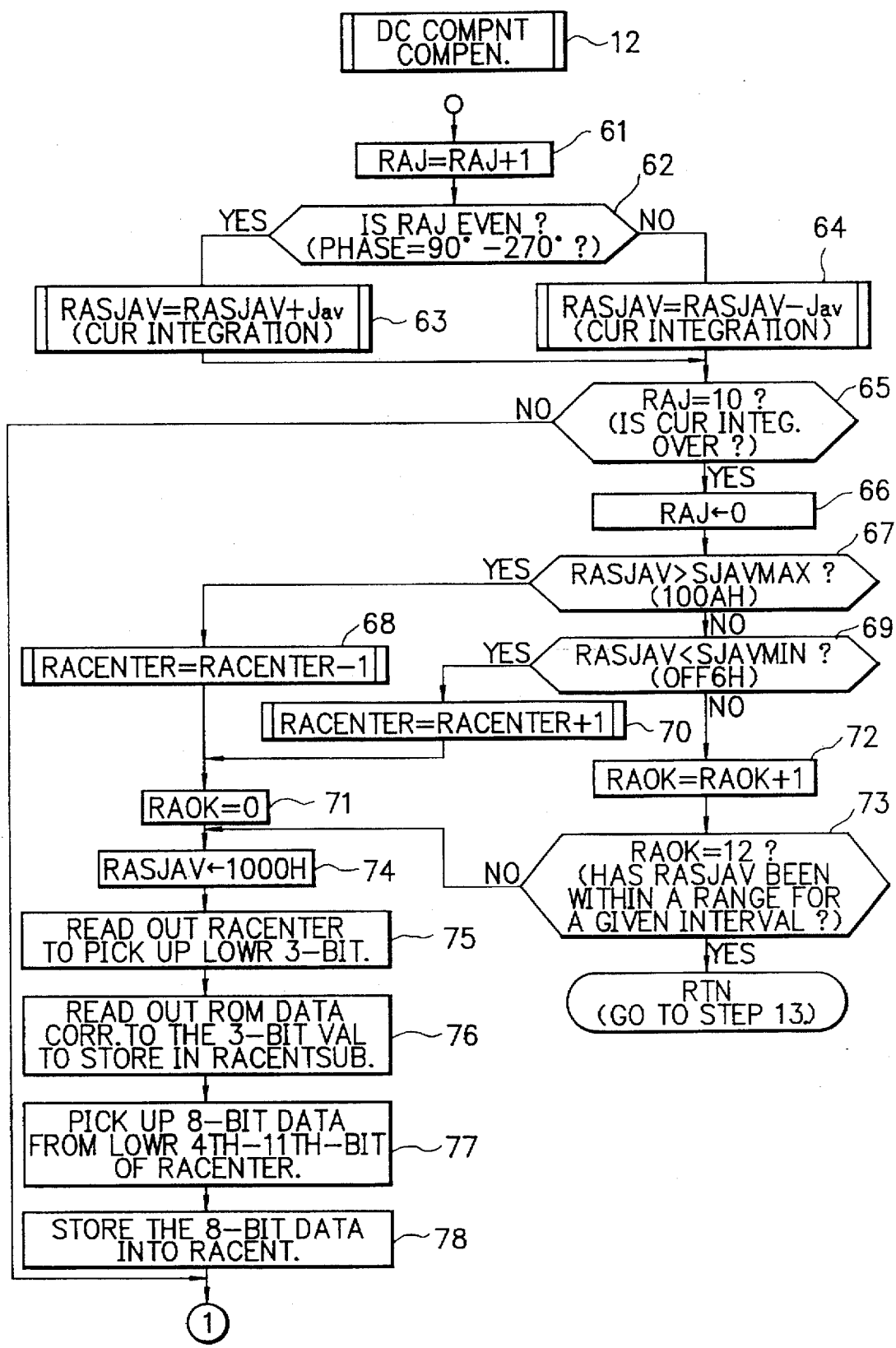
FIG. 7 is a flow chart showing the contents of "DC component compensation" (step 12) in FIG. 3.

When the DC component RASJAV falls within the proper value range, i.e., SJAVMAX≧RASJAV≧SJAVMIN, the microcomputer 22 increments the data RAOK in the register RAOK (its initial value is 0, and this register is cleared to 0 when the data falls outside the proper value range) by one through steps 67 and 69 in FIG. 7 (step 72). The microcomputer 22 then checks whether the data RAOK has reached 12. That is, the microcomputer 22 checks 12 consecutive times in "DC component compensation" (step 12) whether the proper value rage SJAVMAX≧RASJAV≧SJAVMIN. If YES is obtained in this step, the microcomputer 22 applies a 50-Hz AC output voltage to the load LD (step 13 in FIG. 3). With this operation, "DC component compensation" (step 12) is terminated. Subsequently, only "detection of output current-B" (step 14) and "overcurrent control-B" (step 15) are repeatedly executed in this order in a cycle of Ts2×16 without executing "DC component compensation" (step 12) unless a reset operation is performed through the reset switch 21, and as long as the power is continuously supplied. Meanwhile, "timer-2 interrupt processing" (IRT2) and "timer-1 interrupt processing" (IRT1) described above are repeatedly executed in cycles of Ts2 and Ts1, respectively. Since the contents of "detection of output current-B" (step 14) and "overcurrent control-B" (step 15) are the same as those of "detection of output current-A" (step 10) and "overcurrent control-A" (step 11) described above, a description thereof will be omitted.

Figure 8:
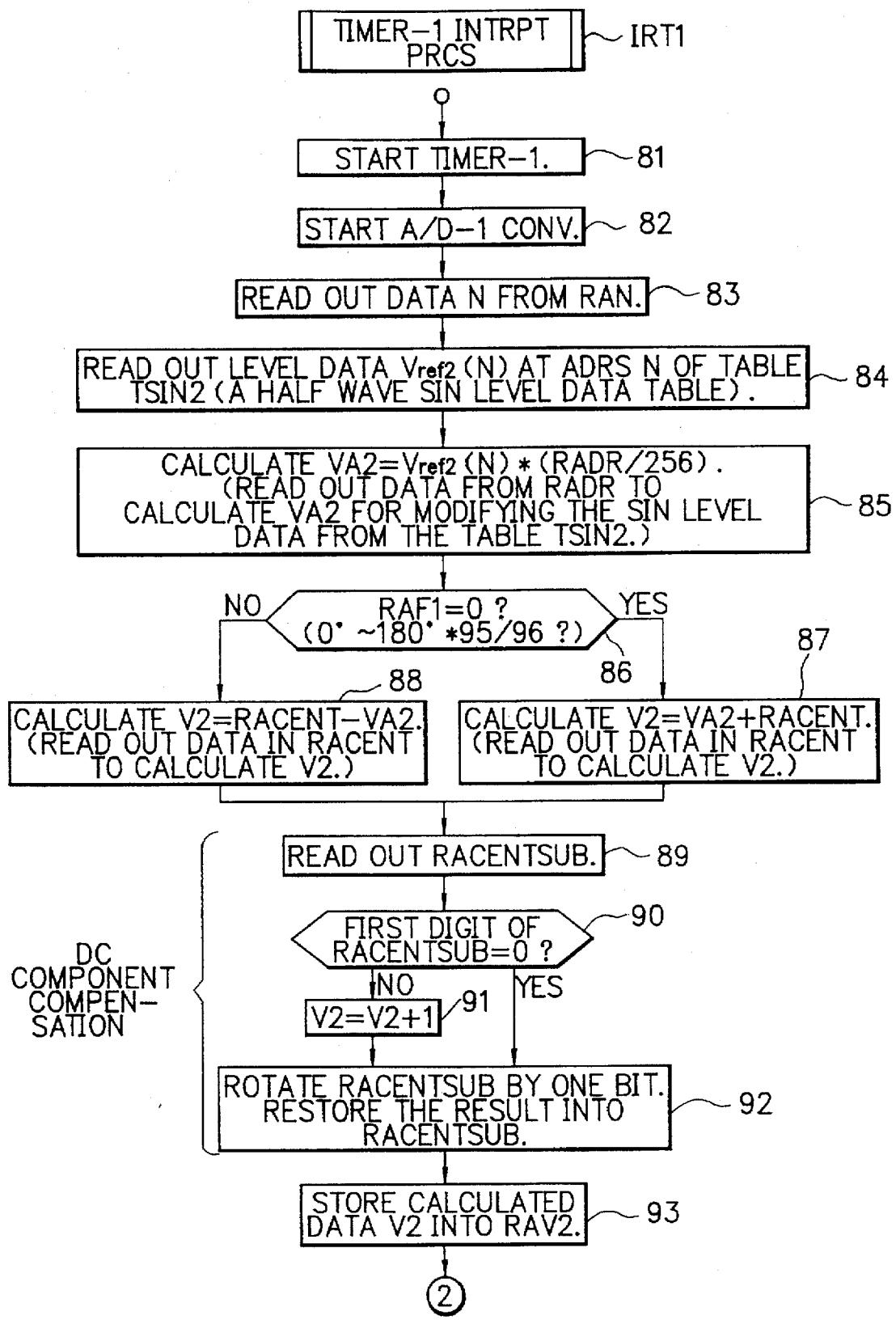
FIG. 8 is a flow chart showing part of the contents of "timer-1 interrupt processing" (IRT1) performed by the microcomputer 22 in FIG. 2A.

The contents of "timer-1 interrupt processing" shown in FIGS. 8 to 12 will be described next. Referring to FIG. 8, first of all, the computer 22 restarts timer 1 (step 81). That is, the computer 22 sets the data Ts1 stored in the register Ts1 in timer 1, and starts a time count operation. This operation is performed to determine the execution start timing of the next "timer-1 interrupt processing" (IRT1). When a timeout of timer 1 occurs, the computer 22 executes "timer-1 interrupt processing" (IRT1) and restarts timer 1 (step 81). "Timer-1 interrupt processing" (IRT1) is therefore repeatedly executed in a cycle of Ts1.

Calculation of Level Data V2 of Second Sine Wave

Figure 17A:
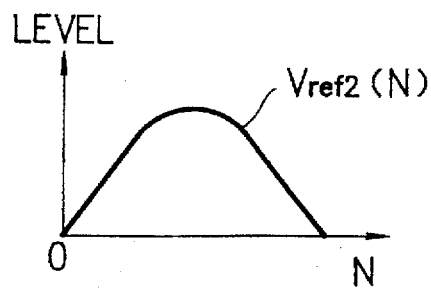
FIG. 17A is a graph showing a voltage waveform represented by sine level data Vref2(N) read out from an internal ROM by the microcomputer 22 in "timer-1 interrupt processing" (IRT1) in FIG. 8.

When timer 1 is restarted, the computer 22 starts digital conversion, i.e., A/D-1 conversion of a voltage (the instantaneous value of a 50-Hz AC output voltage, which is positively biased by the bias circuit 18) at the first A/D conversion input port A/D1 (step 82). The computer 22 then reads out data N (0 to 95; represented by RAN in some cases) from the register RAN (step 83), and reads out the data Vref2 at address N in the table TSIN2 (step 84). The table TSIN2 is assigned to one area of the internal ROM of the computer 22. In this table, the following level data at the respective points (phases) obtained by dividing a half cycle of a second reference sine wave by 96:

Vref2(N)=123 sin(180° *N/96), N=0 to 95 are stored at addresses N=0 to 95. FIG. 17A schematically shows this data. For example, data (0) corresponding to a phase of 0° is stored at address 0 in the table; upper peak data (123) corresponding to a phase of 90° at address 48; and data corresponding to a phase of 180° *95/96, at address 95. In step 84, the computer 22 reads out from the register RAN the data Vref2(N)=123 sin(180° *N/96) where N is the data in the register RAN.

The computer 22 then calculates compensated second sine wave data VA2 having undergone compensation for voltage adjustment:

$$VA2=Vref2(N)*(RADR/256)$$

Figure 17B:
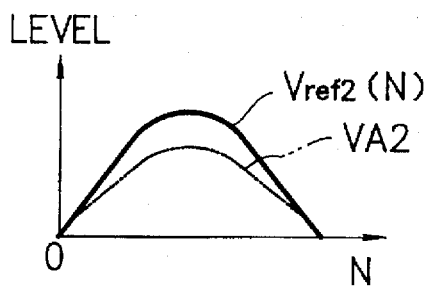
FIG. 17B is a graph showing a voltage waveform represented by data VA2 obtained by compensating for the data Vref2(N) on the basis of an adjustment value RADR for overcurrent control and voltage control.

(where N is the data in the register RAN) on the basis of the data RADR (output voltage adjustment value) in the register RADR (step 85). That is, the level data in the table TSN2 is multiplied by RADR/256 to change the amplitude of the sine wave VA2. FIG. 17B shows the relationship between the data VA2 and the data Vref2(N). The data RADR in the register RADR is set by processing to be described later (steps 112 to 115 in FIG. 12). In brief, this data is an adjustment value for suppressing an overcurrent and making a 50-Hz AC output voltage fall within the set range on the basis of the adjustment value RASREF (the data in the register RASREF) for overcurrent suppression and an integrated voltage value in a half cycle interval of the 50-Hz AC output voltage. This operation will be described in detail later with reference to FIG. 12 and FIG. 19C.

Figure 17C:
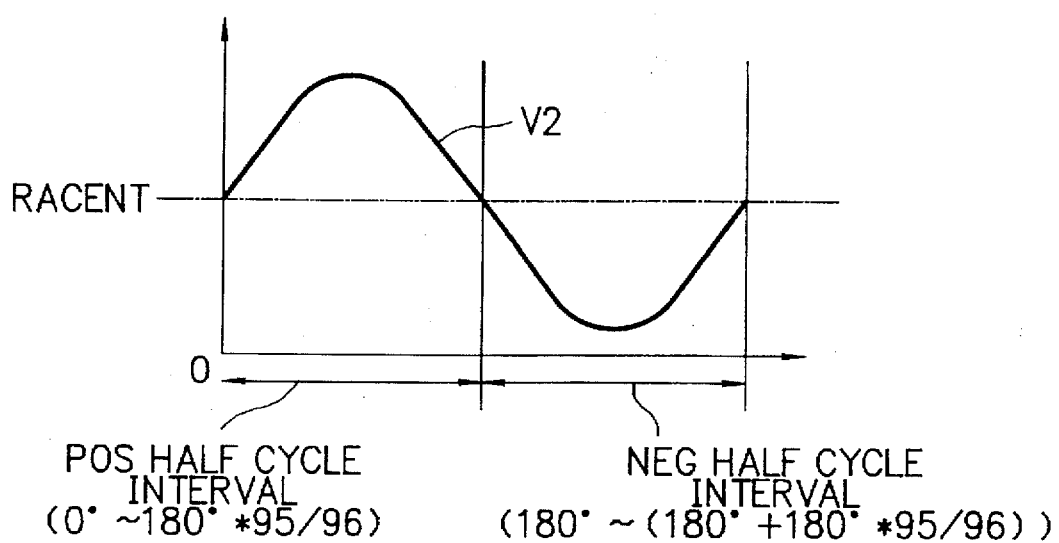
FIG. 17C is a graph showing a voltage waveform represented by data V2 generated on the basis of an adjustment value RACENT for DC component compensation and the data VA2.
Figure 18:
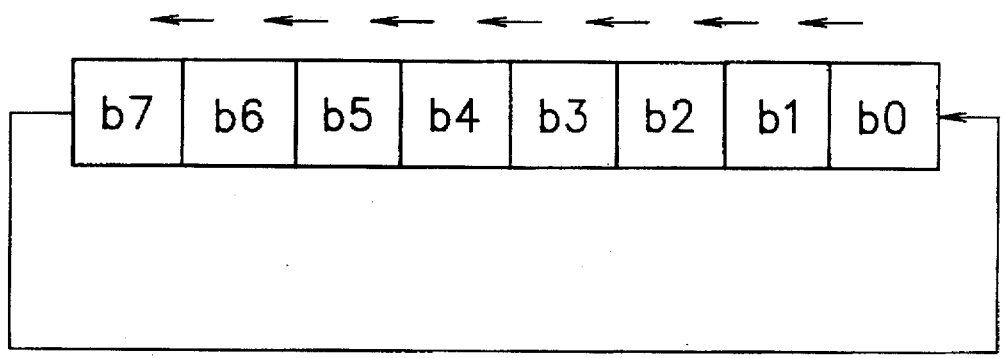
FIG. 18 is a data constitution showing a cyclic shift operation for adjustment data RACENTSUB in "timer-1 interrupt processing" (IRT1) in FIG. 8.

Subsequently, the computer 22 checks whether the current time point belongs to a positive or negative half cycle interval of the 50-Hz AC output voltage (step 86). In step 110 in FIG. 11 (to be described later) and steps 117 to 119 in FIG. 12 (to be described later), the computer 22 detects change between a positive half cycle interval and a negative half cycle interval, and writes data (0: positive half cycle interval/1: negative half cycle interval) indicating a current interval in the register RAF1. In step 86, the computer 22 checks the data RAF1 in the register RAF1 to determine whether the current time point belongs to a positive or negative half cycle interval. If it is determined that the current time point belongs to the positive half cycle interval, the computer 22 calculates V2=VA2+RACENT (step 87). If it is determined that the current time point belongs to the negative half cycle interval, the computer 22 calculates V2=RACENT−VA2 (step 88). That is, as shown in FIG. 17C, the computer 22 calculates the level data of a second sine wave V2 obtained by converting the center axis of the sine wave VA2, obtained by multiplying the level data in the table TSIN2 by RADR/256, into the data RACENT. The data RACENT is the data in the register RACENT, and the integer of an adjustment value for setting a DC component within a set range (steps 66 to 78 in FIG. 7 described above). The computer 22 reads out the data RACENTSUB (8 bits: one of the eight sets in FIG. 16; data at each digit position is cyclically shifted to the left by a cyclic shift (to be described later)) corresponding to the fraction of the adjustment value for setting the DC component within the set range from the register RACENTSUB (step 89). If the least significant bit of the data is "1", the data V2 is incremented by one (steps 90 and 91). If the least significant bit is "0", the data V2 is not changed. The data in the register RACENTSUB is then cyclically shifted to an upper digit by one (step 92). FIG. 18 schematically shows this shift processing. That is, the contents of the register are shifted to an upper bit (left) in units of bits. The most significant bit (b7) is shifted to the least significant bit (b0).

The computer 22 writes the calculated data V2 in the register RAV2 (step 93). Assume that the lower 3 bits of the data RACENTER, which are picked up in step 75 in FIG. 7 described above, represent a numerical value "3" (indicates a fraction "3/8" with respect to the integer represented by the data RACENT). In this case, in the first "timer-1 interrupt processing" (IRT1) after "10010010" is stored in the register RACENTSUB in step 76 in FIG. 7, since the least significant bit of the data RACENTSUB is "0", compensation of the data V2 (step 91) is not executed in steps 90 to 92 in FIG. 8. Since the data RACENTSUB is cyclically shifted by one bit in step 92, "00100101" is stored in the register RACENTSUB. In the second "timer-1 interrupt processing" (IRT1), therefore, compensation of the data V2 (step 91) is executed in steps 90 to 92 in FIG. 8. In step 92, the data RACENTSUB is cyclically shifted by one bit. With this processing, if the lower 3 bits of the data RACENTER, which is picked up in step 75 in FIG. 7, represents the numerical value "3", an operation of incrementing the data V2 calculated in steps 87 and 88 by one (step 91) is executed only three times while "timer-1 interrupt processing" (IRT1) is executed eight times. That is, the operation is executed at a probability of 3/8. More specifically, if the lower 3 bits of the data RACENTER, which is picked up in step 75 in FIG. 7, represents the numerical value i (=0 to 7), the data V2 is changed in step 91 at a probability of i/8. From the time-serial viewpoint (statistically), the data V2 is changed at a probability corresponding to the value (fraction) obtained by dividing the numerical value i represented by the lower 3 bits of the data RACENTER, which is picked up in step 75 in FIG. 7, by 8. FIG. 17C schematically shows the data V2 obtained by the above arithmetic operation.

Calculation of Level Data V1 of First Sine Wave

Figure 9:
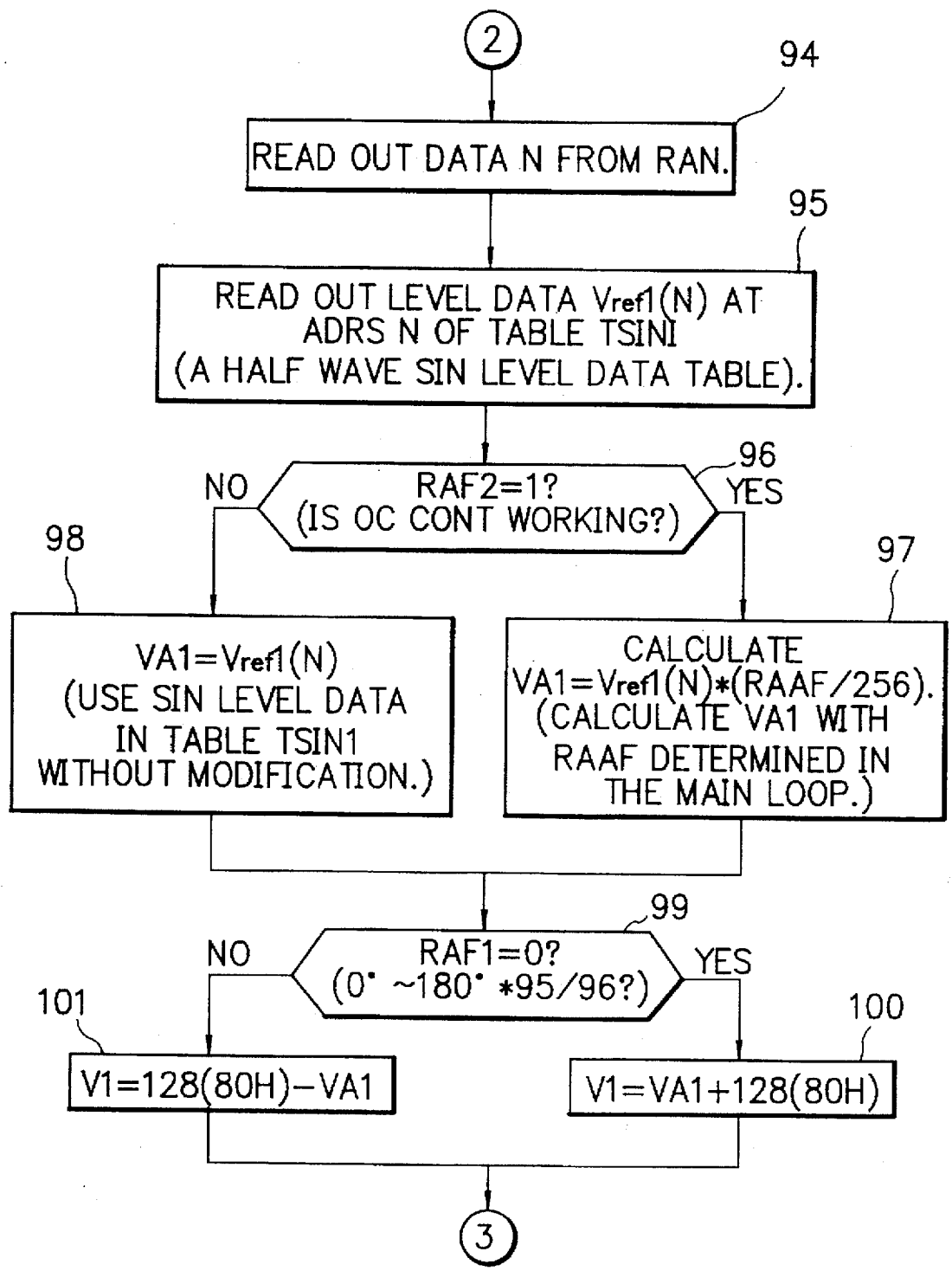
FIG. 9 is a flow chart showing part of the contents of "timer-1 interrupt processing" (IRT1) performed by the microcomputer 22 in FIG. 2A.
Figure 19A:
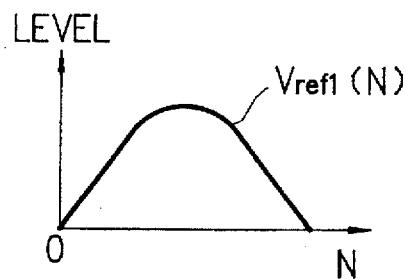
FIG. 19A is a graph showing a voltage waveform represented by sine wave level data Vref1(N) read out from the internal ROM by the microcomputer 22 in "timer-1 interrupt processing" (IRT1) in FIG. 9.

Referring to FIG. 9, upon calculating the data V2 in the above manner and storing it in the register RAV2 (step 93 in FIG. 8), the computer 22 reads out data N from the register RAN (step 94), and reads out data Vref1 at address N in the table TSIN1 (step 95). In this case, the table TSIN1 is assigned to one area in the internal ROM. At addresses N=0 to 95, the following level data at the respective points (phases) obtained by dividing a half cycle of a first reference sine wave by 96:

Vref1(N)=120 sin(180° *N/96), N=0 to 95 are stored. FIG. 19A schematically shows this data. In step 95, the computer 22 reads out the data in the register RAN as this data Vref1(N)=120 sin(180° *N/96) where N is the data in the register RAN. For example, data (0) corresponding to a phase of 0° is stored at address 0 in the table; upper peak data (123) corresponding to a phase of 90° at address 48; and data corresponding to a phase of 180° *95/96, at address 95.

The computer 22 then checks the necessity of overcurrent control by referring to the data in the register RAF2 (step 96). As described above, if the first adjustment value RAAF (the data in the register RAAF) for overcurrent control is not the upper limit (255), "1" indicating the necessity of overcurrent control is written in the register RAF2 (FIG. 6). If the data in the register RFA2 is "1", the computer 22 uses this first adjustment value RAFF to calculate a value VA1, obtained by compensating for the level data Vref1(N) of the first sine wave:

$$VA1=Vref1(N)*(RAAF/256)$$

More specifically, in an overcurrent control operation (RAF2=1), the computer 22 multiplies the level data in the table TSIN1 by RAAF/256 to change the amplitude of the sine wave VA1. If the data in the register RAF2 is "0" (RAAF=255), the computer 22 calculates the value VA1 (steps 97 and 98):

$$VA1=Vref1(N)$$

Figure 19B:
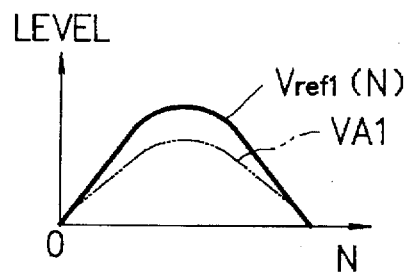
FIG. 19B is a graph showing a voltage waveform represented by data VA1 obtained by compensating for the data Vref1(N) on the basis of an adjustment value RAAF for overcurrent control.

FIG. 19B schematically shows the relationship between the data Vref1(N) and the value VA1.

Figure 19C:
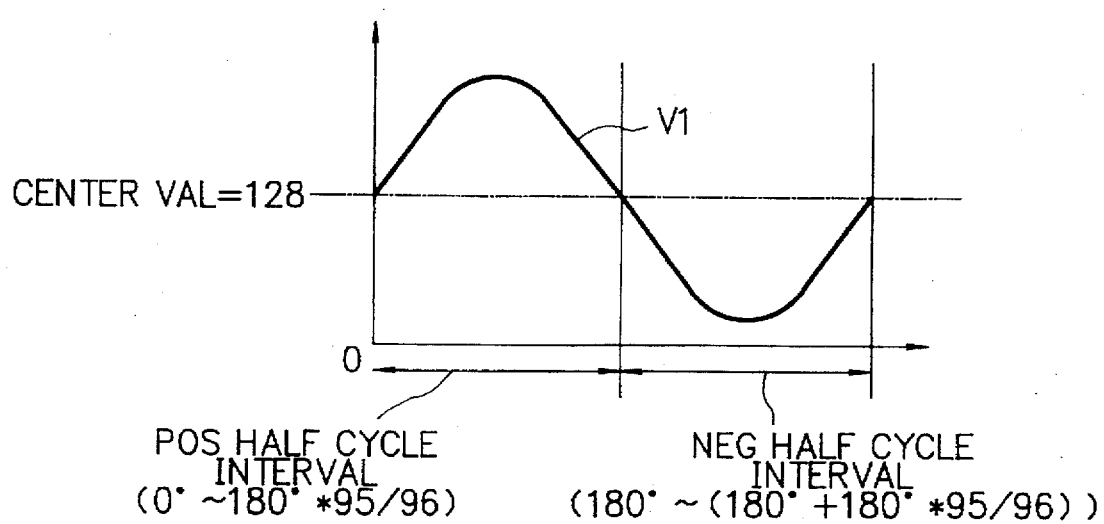
FIG. 19C is a graph showing a voltage waveform represented by data V1 generated on the basis of an adjustment value RACENT for DC component compensation and the data VA1.

Subsequently, the computer 22 checks on the basis of the data in the register RAF1 whether the current time point belongs to a positive half cycle interval (RAF1=0) or a negative half cycle interval (RAF=1) (step 99). If it is determined that the current time point belongs to the positive half cycle interval, the computer 22 calculates V1=VA1+128 (80H) where 128 (80H) is a center value (step 100). If it is determined that the current time point belongs to the negative half cycle interval, the computer 22 calculates V1=128 (80H)-VA1 (step 101). That is, the computer 22 calculates the level data of the first sine wave V1 obtained by converting the center axis of the sine wave VA2, which is obtained by multiplying the level data in the table TSIN1 by RAAF/256, into 128 (80H). FIG. 19C schematically shows the sine wave V1.

Calculation of H Width Vpwm of PWM Pulse

Figure 10:
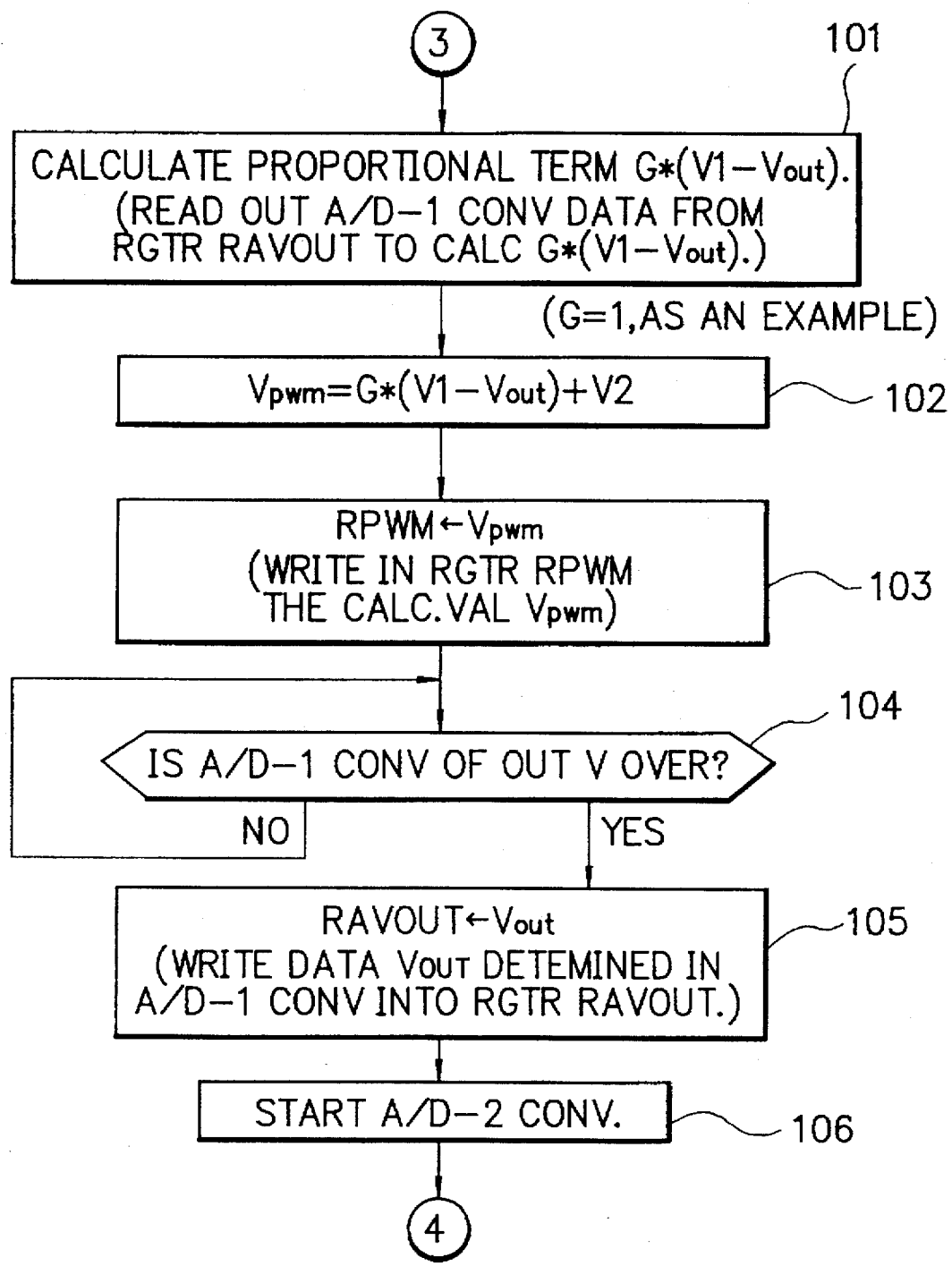
FIG. 10 is a flow chart showing part of the contents of "timer-1 interrupt processing" (IRT1) performed by the microcomputer 22 in FIG. 2A.

Referring to FIG. 10, the computer 22 reads out the data Vout from the register RAVOUT, and calculates the H width G*(V1−Vout) of a PWM pulse which converts the AC output voltage Vout into the sine wave V1 (step 101). In this first embodiment, G=1. Note that the computer 22 has started to load (A/D-1 conversion) the AC output voltage Vout (instantaneous value) in step 82 (FIG. 8) described above. In steps 104 and 105 (FIG. 10) to be described later, the computer 22 stores the digital data Vout obtained by A/D-1 conversion in the register RAVOUT. This processing is performed in "timer-1 interrupt processing" (IRT1) (loading is performed in a cycle of Ts1). That is, the AC output voltage (instantaneous value) data Vout used in step 101 is a value loaded Ts1 before the currently loaded data (A/D-1 conversion) (started in step 82).

The computer 22 adds the data V2 to the calculated data G*(V1−Vout) to calculate the H width Vpwm of the PWM pulse (step 102) as follows:

$$Vpwm=G*(V1-Vout)+V2$$

Since G=1, the above equation can be rewritten into $$Vpwm=(V1+V2)-Vout.$$

This calculated data Vpwm is stored in the register RPWM (step 103). That is, the data in the register RPWM is updated into the latest calculated value. Note that with the above PWM interrupt processing, the PWM pulse which is kept at H level during the period indicated by the data Vpwm in the register RPWM and kept at L level during the period indicated by Tpwm−Vpwm is output from the output port PWM of the computer 22 to the pulse inverter 23.

The relationship between the H (high-level) width Vpwm of a PWM pulse and a 50-Hz AC output voltage will be described below. In the above equation for obtaining the width Vpwm, since G=1 is set in the first embodiment to facilitate calculation, Vpwm=(V1+V2)−Vout. FIGS. 19C and 17C respectively show the waves V1 and V2. The center value of the wave V1 is 128 (80H), and the center value of the wave V2 is the data RACENT. Both waves cross the center axes at the same position (time). That is, the data V1 and V2 are synchronous. (V1+V2) therefore represents a sine wave (synthetic wave) synchronous with the waves V1 and V2. The center value of this wave is represented by RACENT+128 (80H). For the sake of descriptive convenience, assume that the value RACENT is set to 128 (80H) as an initial value after DC component compensation. In this case, the center value of the wave (V1+V2) is 128×2. When the output voltage is 0 V, the value obtained by A/D-1 conversion performed by the computer 22 is given by Vout=128 because the output voltage is positively biased by the bias circuit 18. In this case, therefore, Vpwm=(V1+V2)−Vout becomes 128, which is the center value. If an interval in which the wave is higher in level than this center axis is defined as a positive half cycle interval, and an interval in which the wave is low in level than the center axis is defined as a negative half cycle interval, the H width of the PWM pulse which gives a voltage level of 0 at the start point (0°) of the positive half cycle interval and the start point (180°) of the negative half cycle interval is Tpwm/2 (duty ratio of 50%). In an H width interval of the PWM pulse, the switching elements Qy and Qu are turned on, and the output terminals 4a and 4b of the switching circuit are respectively set at positive and negative potentials. In an L width interval of the PWM pulse, the switching elements Qx and Qv are turned on, and the output terminals 4a and 4b of the switching circuit are respectively set at negative and positive potentials. When the duty ratio of the PWM pulse is 50%, both terminals 4a and 4b are set at a potential of 0 V (output voltage of 0 V) in terms of a time-serial mean. As the H width of the PWM pulse is increased from a duty ratio of 50% (as the duty ratio is increased), the output terminals 4a and 4b are respectively set at positive and negative potentials in terms of a time-serial mean. As a result, the voltage (positive voltage) between the terminals 4a and 4b rises. As the H width of the PWM pulse is decreased from a duty ratio of 50% (as the duty ratio is decreased), the output terminals 4a and 4b are respectively set at negative and positive potentials in terms of a time-serial mean. As a result, the absolute value of the voltage (negative voltage) between the terminals 4a and 4b increases.

The above description is a simplified one. In practice, the dead time generation circuit 24 (FIG. 2A) is used to set a dead time (delay time) at each leading edge so as to eliminate the possibility that the switching elements Qy and Qu and the switching elements Qx and Qv are simultaneously turned on (the DC power supply 1 is short-circuited). In addition, compensation (e.g., adjustment of the data RACENT) and the like are performed for adjustment of an output DC component. For this reason, there is some difference from the above simplified description.

Referring to FIG. 10 again, as described above, the computer 22 calculates the H width interval Vpwm of the PWM pulse, and writes it in the register RPWM (step 103). The computer 22 waits for the completion of A/D-1 conversion started in step 82 in FIG. 8 (step 104), and writes the converted data Vout in the register RAVOUT (step 105). In this case, the data in the register RAVOUT is updated into the latest output AC voltage (instantaneous value).

Subsequently, the computer 22 starts A/D conversion of an input voltage (the instantaneous value of a 50-Hz AC output current) at the second A/D conversion input port A/D2 (step 106). The data Jout obtained by this A/D-2 conversion is written in the register RAJOUT in steps 33 and 34 in "detection of output current-A" (step 10) during a non-load period. While power is supplied to the load, the above data is written in the register RAJOUT in the steps corresponding to "detection of output current-B" (step 14). The above write operation for the data Jout in "detection of output current-A" (step 10) and "detection of output current-B" (step 14) is performed in a cycle of Ts2. However, A/D conversion at the port A/D2 is started (step 106) in a cycle of Ts1. Since Ts2=6×Ts1, data obtained by A/D-2 conversion is sampled once for every six times of A/D-2 conversion.

Feedback of AC Output Voltage

Figure 11:
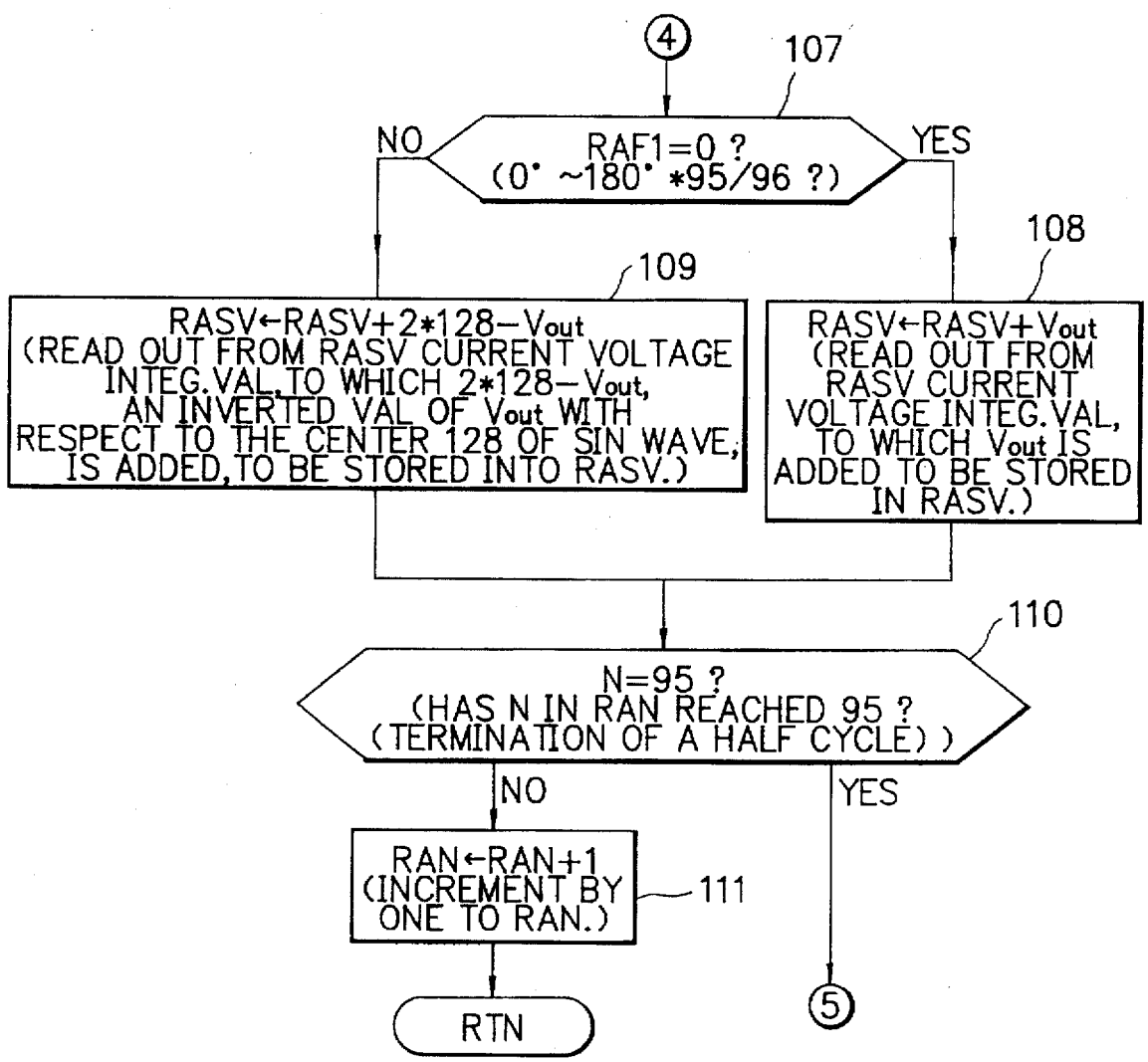
FIG. 11 is a flow chart showing part of the contents of "timer-1 interrupt processing" (IRT1) performed by the microcomputer 22 in FIG. 2A.
Figure 20:
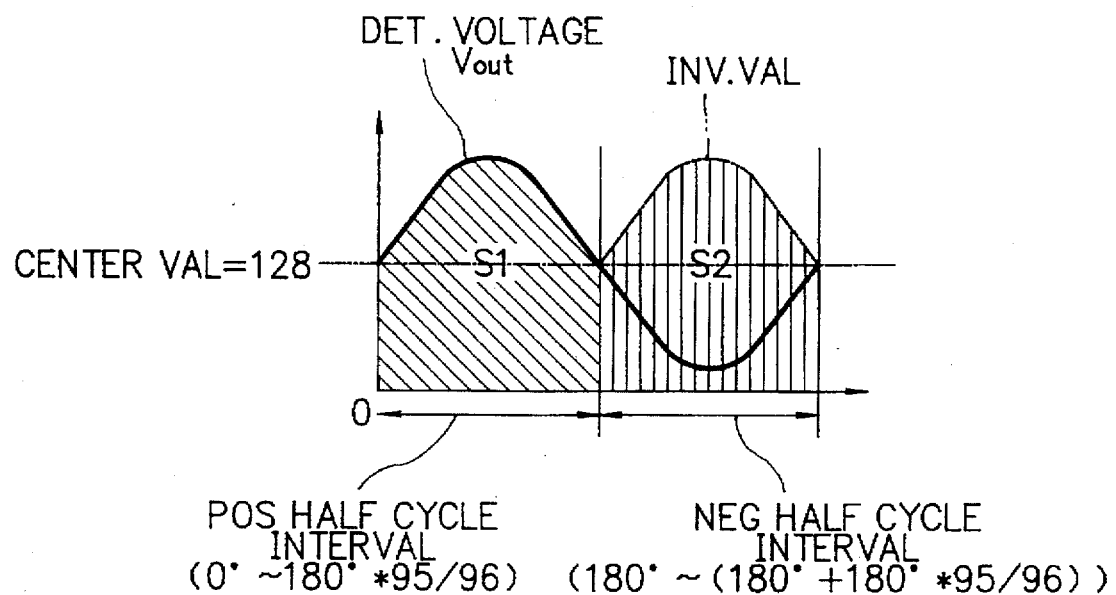
FIG. 20 is a graph showing a waveform indicating the integrated values of detected output AC voltage values, which are calculated by the microcomputer 22 in "timer-1 interrupt processing" (IRT1) in FIG. 11, with an oblique line area (positive half cycle interval) and a vertical line area (negative half cycle interval)

Referring to FIG. 11, the computer 22 checks on the basis of the data in the register RAF1 whether the current time point belongs to a positive or negative half cycle interval of an AC output voltage (step 107). If it is determined that the current time point belongs to the positive half cycle interval, the computer 22 adds up (positive addition) the latest data Vout (the data stored in the register RAVOUT in step 105) to the data in the voltage integration register RASV. That is, the computer 22 adds up the data Vout to the data RASV in the register RASV, and writes the sum in the register RASV (step 108). As indicated by an area S1 indicated by the lines obliquely descending to the right in FIG. 20, voltage integration is performed. If it is determined that the current time point belongs to the negative half cycle interval, since the detected voltage Vout is located on the side where the level is lower than the center value "128", the detected voltage Vout is inverted with respect to the center value "128", and the inverted value is added to the data in the voltage integration register RASV. That is, the computer 22 adds 128+(128−Vout)=2*128−Vout to the data RASV in the register RASV, and writes the sum in the register RASV (step 109). This operation is equivalent to voltage integration, as indicated by an area S2 indicated by the vertical lines in FIG. 20.

Subsequently, the computer 22 checks whether the current time point is at the termination of a half cycle interval (step 110). If it is determined that the current time point is not at the terminal of a half cycle interval, the computer 22 increments the data RAN in the phase count register RAN by one (updates N into a value larger than N by one) (step 111), and terminates this "timer-1 interrupt processing" (IRT1) (the flow returns to the processing immediately before "timer-1 interrupt processing").

Referring to FIG. 12, if it is determined that the current time point is at the terminal of a half cycle interval, the computer 22 compares the data SV in the voltage integration register RASV with the data Sref in the register RASREF. The register RASV is cleared in step 116 to be described later. In this case, therefore, the data SV in the voltage integration register RASV indicates the integrated voltage value (S1 or S2 in FIG. 20) in the half cycle interval which has currently reached the termination. The data Sref in the register RASREF is the data set therein to perform overcurrent adjustment in "overcurrent control-A" (step 11) in FIG. 3 before power is supplied to the load LD, and is the data set in the register RASREF to perform overcurrent adjustment in "overcurrent control-B" (step 15) after power is supplied to the load LD (steps 47 to 49 in FIG. 6/steps 55 to 57 in FIG. 14).

The upper limit "18888" of the data Sref in the register RASREF is a set value (fixed value) that determines Vpwm to set the root-mean-square value of a 50-Hz AC output voltage to 100 V. When an overcurrent flows, the data Sref in the register RASREF is decreased (steps 41 and 43 to 48 in FIG. 6). When no overcurrent flows, the data Sref is increased toward to the upper limit (steps 41 and 50 to 56 in FIG. 6). While a current equal in level to the set overcurrent value Jref flows, the data Sref is not changed (steps 41 and 42 and "return" in FIG. 6).

In step 112 in FIG. 12, the computer 22 compares the integrated voltage value SV in the half cycle interval with the data Sref for overcurrent control. If SV=Sref, the computer 22 does not change the adjustment value RADR (the data stored in the register RADR) for reflecting the data SV and Sref in the data Vpwm (step 113). If SV>Sref, since the output voltage is excessively high, the adjustment value RADR is decreased by a minimum adjustment unit ΔDR. That is, the data in the register RADR is decremented by one (step 114). If SV<Sref, since the output voltage is low, the adjustment value RADR is increased by the minimum adjustment unit ΔDR. That is, the data in the register RADR is incremented by one (step 115). Note that this adjustment value RADR (the data stored in the register RADR) is used to calculate the above compensation level VA2 (calculated on the basis of the data V2) in step 85 in FIG. 8, as described above.

Since the current time point is at the termination of the half cycle interval, the computer 22 clears both the phase count register RAN and the voltage integration register RASV (steps 116), and checks whether the interval which has reached the termination is a positive half cycle interval (RAF1=0) or a negative half cycle interval (RAF1=1) (step 117). If a positive half cycle interval (RAF1=0) is determined, since a negative half cycle interval will come next time, the computer 22 writes "1" indicating this interval in the register RAF1. If a negative half cycle interval (RAF1=1) is determined, since a positive half cycle interval will come next time, the computer 22 writes "0" indicating this interval in the register RAF1 (steps 118 and 119). The computer 22 then terminates this "timer-1 interrupt processing" (IRT1) (the flow returns to the processing immediately before this "timer-1 interrupt processing").

The contents of "timer-1 interrupt processing" (IRT1) have been described above. As described above, this processing is repeated in a cycle of Ts1=1/9.6 kHz≈104.17 μsec.

The characteristics features of the above embodiment will be described next.

(1) Processing During Non-load Period

As described above, the computer 22 keeps outputting a PWM pulse having a period given by $$Tpwm=255/f\approx34.59\ \mu sec$$

to the pulse inverter 23 in the interval between the instant at which the computer 22 starts to output the PWM pulse (step 8 in FIG. 3) and the instant at which the computer 22 starts to supply power to the load LD (step 13 in FIG. 3). Note that the frequency of an AC output voltage from the inverter is 50 Hz, and a period T50 is given by $$T50=1\ sec/50=20,000\ \mu sec.$$

"Timer-1 interrupt processing" (IRT1: FIGS. 8 to 12) is repeated in a cycle given by $$Ts1=1/9.6\ kHz\approx104.17\ \mu sec.$$

In this "timer-1 interrupt processing", the first A/D conversion (A/D-1 conversion) is performed to load the AC output voltage (instantaneous value) Vout, and the resultant data Vout is stored in the register RAVOUT (step 82 in FIG. 8 and step 105 in FIG. 10). That is, the AC output voltage (instantaneous value) Vout is sampled in a cycle of Ts1.

In "timer-1 interrupt processing", the second A/D conversion (A/D-2 conversion) is performed to load the AC output current (instantaneous value) Jout. This converted data Jout is written in the register RAJOUT in step 34 (FIG. 5) in "detection of output current-A" (step 10). Since "detection of output current-A" (step 10) is executed in a cycle of Ts2, sampling of the AC output current (instantaneous value) Jout is substantially performed in a cycle of Ts2.

"Timer-2 interrupt processing" (IRT2: FIG. 4) is repeated in a cycle given by $$Ts2=6/9.6\ kHz\approx625\ \mu sec.$$

In "detection of output current-A" (step 10), the computer 22 waits for the completion of "timer-2 interrupt processing" (IRF2=0 IRF2=1) in "detection of output current-A" (step 10). Thereafter, the computer 22 loads the AC output current (instantaneous value) Jout and calculates the mean AC current value Jav. The internal arithmetic processing in "detection of output current-A" (step 10) is therefore repeated in a cycle of Ts2. "Detection of output current-A" (step 10) is continuously performed until 16 sampled data Jout (16 times of sampling) are obtained. When 16 sampled data Jout are obtained (16 times of sampling), and the mean value Jav of these data is calculated, one process of "detection of output current-A" is completed. Consequently, "detection of output current-A" (step 10) is repeated in a cycle of Ts2×16.

Since the flow advances to "overcurrent control-A" (step 11) immediately after the execution of "detection of output current-A" (step 10), "overcurrent control-A" is repeated in a cycle of Ts2×16.

Similarly, "DC component compensation" is repeated in a cycle of Ts2×16. With this repetitive execution of "DC component compensation" (step 12), the adjustment value is adjusted to make the DC component fall within the set range.

When the DC component falls within the set range, preparatory processing (repetitive execution of steps 10 to 12 in FIG. 3) for load energization is completed, and the relay 8r is turned on to energize the load.

(2) Processing During Load Energization

A PWM pulse having a period given by $$Tpwm=255/f=34.59\ \mu sec$$

is continuously output from the computer 22 to the pulse inverter 23. "Timer-1 interrupt processing" (IRT1: FIGS. 8 to 12) is repeated in a cycle given by $$Ts1=1/9.6\ kHz=104.17\ \mu sec.$$

Sampling of the AC output voltage (instantaneous value) Vout is performed in a cycle of Ts1, and sampling of the AC output current (instantaneous value) Jout is substantially performed in a cycle of Ts2.

"Timer-2 interrupt processing" (IRT2: FIG. 4) is repeated in a cycle given by $$Ts2=6/9.6\ kHz=625\ \mu sec.$$

In "detection of output current-B" (step 14) which is the same processing as "detection of output current-A" (step 10), the computer 22 waits for the completion of "timer-2 interrupt processing" (IRF2=0 IRF2=1). Thereafter, the computer 22 loads the AC output current (instantaneous value) Jout (i.e., stores the data obtained by A/D-2 conversion) and calculates the mean AC current value Jav. The internal arithmetic processing in "detection of output current-B" (step 14) is repeated in a cycle of Ts2. "Detection of output current-B" (step 14) is continuously performed until 16 sampled data Jout (16 times of sampling) are obtained. When 16 sampled data Jout (16 times of sampling) are obtained, and the mean AC current value Jav is calculated, one process of "detection of output current-B" is completed. "Detection of output current-B" (step 14) is repeated in a cycle of Ts2×16.

Since the flow advances to "overcurrent control-B" (step 15), in which the same processing as "overcurrent control-A" (step 11) is performed, immediately after the execution of "detection of output current-B" (step 14), "overcurrent control-B" is repeated in a cycle of Ts2×16.

While the load is energized (the relay 8r is kept on), PWM interrupt processing for outputting a PWM pulse, "timer-1 interrupt processing" (IRT1), and "timer-2 interrupt processing" (IRT2) are executed, and "detection of output current-B" (step 14) and "overcurrent control-B" (step 15) are continuously and repeatedly executed in a cycle of Ts2×16. Since "DC component compensation" (step 12) is not executed, the adjustment value for DC component compensation is kept to be the adjustment value (the adjustment value for DC component compensation during a non-load period) immediately before the relay 8r is switched from the OFF state to the ON state. In "timer-1 interrupt processing" (IRT1), the H width Vpwm of a PWM pulse is determined on the basis of this adjustment value and the adjustment value in "overcurrent control-B" (step 15).

(3) AC Output Voltage (50 Hz) Generation Processing 1

In the above embodiment, in order to output a sine AC output having a predetermined level, AC output phases (N) are counted in the register RAN in "timer-1 interrupt processing" (IRT1) which is repeated in a cycle of Ts1. The AC output voltage (instantaneous value) Vout is sampled, and the data Vref1(N) having a phase (N) of the sine level data Vref1(N), N=0 to 95 corresponding to a half cycle is read out from the table TSIN1. The duty ratio (Vpwm/Tpwm) of the output PWM pulse corresponding to the difference between the readout data Vref1(N) and the detected AC output voltage Vout is determined (FIGS. 9 and 10).

This processing is relatively simple. With the processing, a sine AC voltage having a predetermined level is generated with a high waveform precision. Feedback of the AC output voltage Vout enables the instantaneous voltage value to follow a target instantaneous value (to generate an accurate sine wave).

(4) According to the above embodiment, in "overcurrent control-A" (step 11) and "overcurrent control-B" (step 15), which are repeated in a cycle of Ts2×16, the mean AC current value Jav is calculated and compared with the set overcurrent value Jref. If the mean value Jav is larger than the set overcurrent value Jref, the adjustment value RAAF is increased. In "timer-1 interrupt processing" (IRT1), which is repeated in a cycle of Ts1, the readout data Vref1(N) is multiplied by (RAAF/256) to obtain VA1=Vref1(N)* (RAAF/256). The duty ratio (Vpwm/Tpwm) of a PWM pulse is determined in accordance with the difference between this value VA1 and the detected AC output voltage Vout (FIGS. 9 and 10).

With this processing, the mean AC output current value Jav converges to a value equal to or smaller than the set overcurrent value Jref. That is, an overcurrent is suppressed.

(5) AC Output Voltage (50 Hz) Generation Processing 2

In the above embodiment, in order to output a sine AC voltage having a predetermined level, AC output phases (N) are counted in the register RAN in "timer-1 interrupt processing" (IRT1) which is repeated in a cycle of Ts1. The AC output voltage (instantaneous value) Vout is sampled, and the data Vref2(N) having the phase (N) of the half cycle sine level data Vref2(N), N=0 to 95 in the table TSIN2 is read out. The duty ratio (Vpwm/Tpwm) of an output PWM pulse is determined in accordance with the difference between the readout value Vref2(N) and the detected AC output voltage Vout (steps 102 and 103 in FIGS. 8 and 10).

This processing is relatively simple. With the processing, a sine AC voltage having a predetermined level is generated with a high waveform precision.

(6) According to the above embodiment, in "timer-1 interrupt processing" (IRT1), which is repeated in a cycle of Ts1, the integrated AC output voltage value SV (the data stored in the register RASV at the termination of a half cycle) is detected. In each half cycle of the AC output voltage, the adjustment value RADR is decreased if the integrated value SV is larger than the reference value Sref (the data in the register RASREF), and is increased if the integrated value SV is smaller than the reference value Sref. VA2=Vref2(N)*(RADR/256) is calculated. The duty ratio (Vpwm/Tpwm) of an output PWM pulse is determined in accordance with the difference between this value VA2 and the detected AC output voltage Vout (steps 102 and 103 in FIGS. 8 and 10).

With this processing, the AC output voltage converges to the reference value. That is, an overvoltage or a voltage drop is suppressed. Feedback of the AC output voltage Vout enables the instantaneous value to follow a target instantaneous value (generate an accurate sin wave).

(7) AC Output Voltage (50 Hz) Generation Processing (1+2)

In the above embodiment, the AC output voltage (50 Hz) generation processing 1 described in (3) is combined with the AC output voltage (50 Hz) generation processing 2 described in (5). More specifically, in the above embodiment, G=1, and Vpwm=G*(V1−Vout)+V2 (step 102 in FIG. 10). That is, Vpwm=(V1+V2)−Vout V1=128 (80H)−VA1 (negative half cycle interval), or
 VA1+128 (80H) (positive half cycle interval)

VA1=Vref1(N)*(RAAF/256)

V2=RACENT−VA2 (negative half cycle interval), or
 VA2+RACENT·(positive half cycle interval)

VA2=Vref2(N)*(RADR/256).

The effects described in (3) to (6) can be obtained at the same time.

(8) Suppression of DC Component

According to the above embodiment, in "DC component compensation" (step 12), the integrated DC component value RASJAV of AC outputs (five cycle intervals of the output AC voltage) is detected, and the adjustment value RACENTER is adjusted (FIG. 7) to make the integrated value fall within the set range (equal to or smaller than SJAVMAX and equal to or larger than SJAVMIN). Since this adjustment value RACENTER is large and cannot be expressed by 1-byte data, the value RACENTER is expressed by 2-byte data.

In order to simplify the arithmetic processing, data corresponding to ⅛ of this 2-byte data RACENTER is calculated and stored in the register RACENT. The data RACENT in the register RACENT is made to correspond to the center level (zero potential level) of the AC output.

The division processing for obtaining the above ⅛ data is simplified as follows. The lower 3-bit data of the 2-byte data RACENTER is omitted, and 8-bit data consisting of the lower 4th to 11th bits is picked up as the data RACENT. Therefore, the fraction resulting from the division processing for obtaining the ⅛ data is omitted from the data RACENT.

In order to pick up this fraction and reflect it in DC component suppression, the lower 3-bit data (the value that represents the numerical value i as one of 0 to 7, and becomes one of 0/8 to 7/8 after the division processing) is converted into 8-bit data (the contents in the ROM data in FIG. 16) containing "1"s which are equal in number to the numerical value i (0 to 7) and distributed at as equal a pitch as possible, and the resultant data is stored in the register RACENTSUB. On the basis of this fraction adjustment data RACENTSUB (the data in the register RACENTSUB), the value V2 is changed, in minimum units, the number of times corresponding to the number of "1"s in the data RACENTSUB while calculation for the value V2 is performed eight times ("timer-1 interrupt processing" (IRT1) is executed eight times).

With this processing, the value V2 is changed by i/8 in terms of the mean in the time during which "timer-1 interrupt processing" (IRT1) is executed eight times (timeserial mean). In order to realize this, the data in the register RACENTSUB is cyclically shifted by one bit every time "timer-1 interrupt processing" (IRT1) is executed (steps 89 to 93 in FIG. 8; FIG. 18).

When division of 1/(the nth power of 2) (n=3 in the above embodiment) is to be performed, data picked up as a fraction consists of the lower n bits of the data RACENTER, and the numerical value i represented by the n bits is 0 to ((the nth power of 2)−1). The required number of data bits of the data RACENTSUB is the nth power of 2. As the value n increases, the compensation amount for the value V2 for DC component compensation can be changed in smaller steps. However, a larger number of bits are required for the data RACENTSUB. The data RACENTSUB is obtained by reading out data corresponding to the numerical value i represented by lower n bits of the data RACENTER from the ROM (step 76 in FIG. 12), or performing an arithmetic operation, e.g., cyclically shifting the data RACENTSUB for compensation in the next timer-1 interrupt processing (step 92 in FIG. 8). In order to simplify such an arithmetic operation and shorten the processing time, the data RACENTSUB preferably is made to match the standard data unit (1 byte=8 bits in this embodiment) in the microcomputer 22.

(9) In the first embodiment, when it is detected that a DC component continuously falls within the set range while "DC component compensation" (step 12), which is executed in a cycle of Ts2×16, is consecutively executed 12 times, "DC component compensation" (step 12) is not executed afterward. Subsequently, the adjustment values RACENT and RACENTSUB which are determined immediately before "DC component compensation" is consecutively executed 12 times are held, and the data Vpwm is calculated on the basis of these values.

(10) "DC component compensation" (step 12) is performed in a non-load state. As described with reference to (9), when it is detected that a DC component continuously falls within the set range while "DC component compensation" (step 12) is consecutively executed 12 times, supply of power to the load is started. While the power is supplied to the load, the adjustment values RACENT and RACENTSUB, which are set immediately before "DC component compensation" is consecutively executed 12 times, are held. "DC component compensation" (step 12) is not executed, and only "detection of output current-B" (step 14) and "overcurrent control-B" (step 15) are repeatedly executed in this order in a cycle of Ts2×16. Meanwhile, the data Vpwm is adjusted on the basis of the adjustment values RACENT and RACENTSUB, the adjustment value RAAF for overcurrent suppression, the adjustment value RASREF (Sref) for overcurrent suppression, and the adjustment value RADR based on the integrated output voltage value RASV (SV).

With this processing, a DC component and an overcurrent during a non-load period are suppressed, and an output voltage is maintained at a predetermined level (root-mean-square value: 100 V). In addition, even while power is supplied to the load, a DC component and an overcurrent are suppressed, and an output voltage is maintained at a predetermined level (root-mean-square value: 100 V).

The reason why "DC component compensation" (step 12) is performed in a non-load state will be described below. This embodiment uses the phenomenon that the balance between positive and negative half waves of an output AC current flowing between the output terminals 4a and 4b is impaired by a DC component. That is, DC component compensation is performed by checking the balance of an output AC current. The balance of an output AC current is greatly impaired by a DC component especially when only inductor parts are connected between the output terminals 4a and 4b. When DC component compensation is to be performed, the relay 8r is turned off to set a non-load state, thereby setting a state wherein only the inductor parts (5 and 6) are connected between the output terminals 4a and 4b. In this state, DC component compensation is performed.

Second Embodiment

Figure 21:
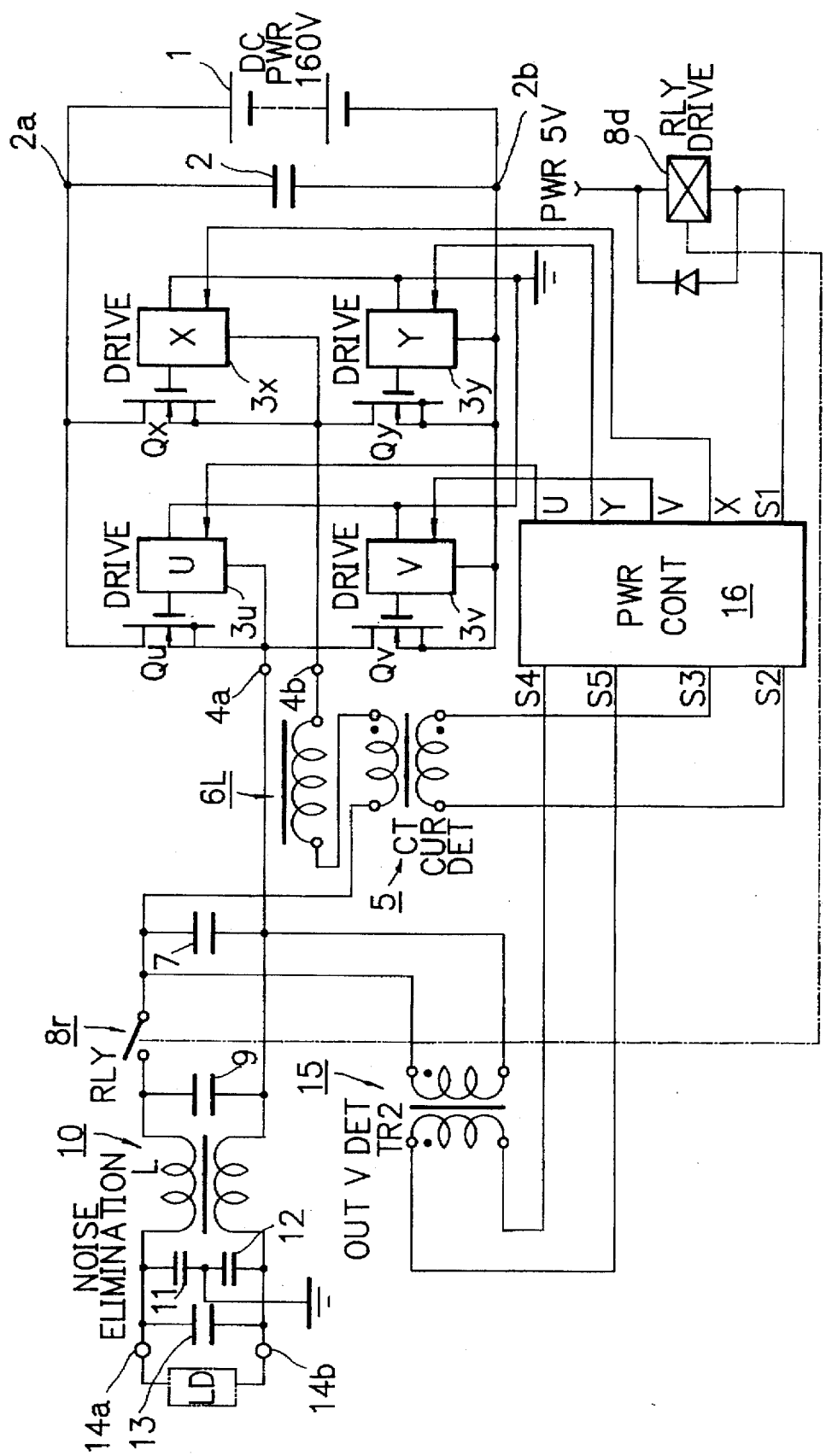
FIG. 21 is a block diagram showing the arrangement of the second embodiment of the present invention.

FIG. 21 shows the arrangement of the second embodiment of the present invention. In the second embodiment, a DC power supply 1 applies a voltage of 160 V between DC input terminals 2a and 2b. A reactor 6L is connected to AC output terminals 4a and 4b of a switching circuit (Qu, Qy, 3u, and 3y, or Qv, Qy, 3u, and 3x). A capacitor 7 is connected to the reactor 6L. In the first embodiment, the step-up transformer 6 and the capacitor 7 constitute the LC low-pass filter circuit for generating a 50-Hz alternating current. The step-up transformer 6 boosts a DC voltage of 48 V to a 50-Hz AC voltage of 100 V. In the second embodiment, the reactor 6L and the capacitor 7 constitute an LC low-pass filter circuit for generating a 50-Hz alternating current, but no boosting operation is performed.

For this reason, a 160-V power supply is used as the DC power supply 1. Although a DC voltage of 141 V can be used to obtain a 100-V AC voltage, a DC voltage of 160 V is applied between the DC input terminals 2a and 2b to compensate for a voltage drop due to a switching operation and cope with load variations. Other hardware arrangements in the second embodiment are the same as those in the first embodiment. In addition, the hardware arrangement and control operation of a power control circuit 16 in the second embodiment are the same as those in the first embodiment.

Third Embodiment

Figure 22:
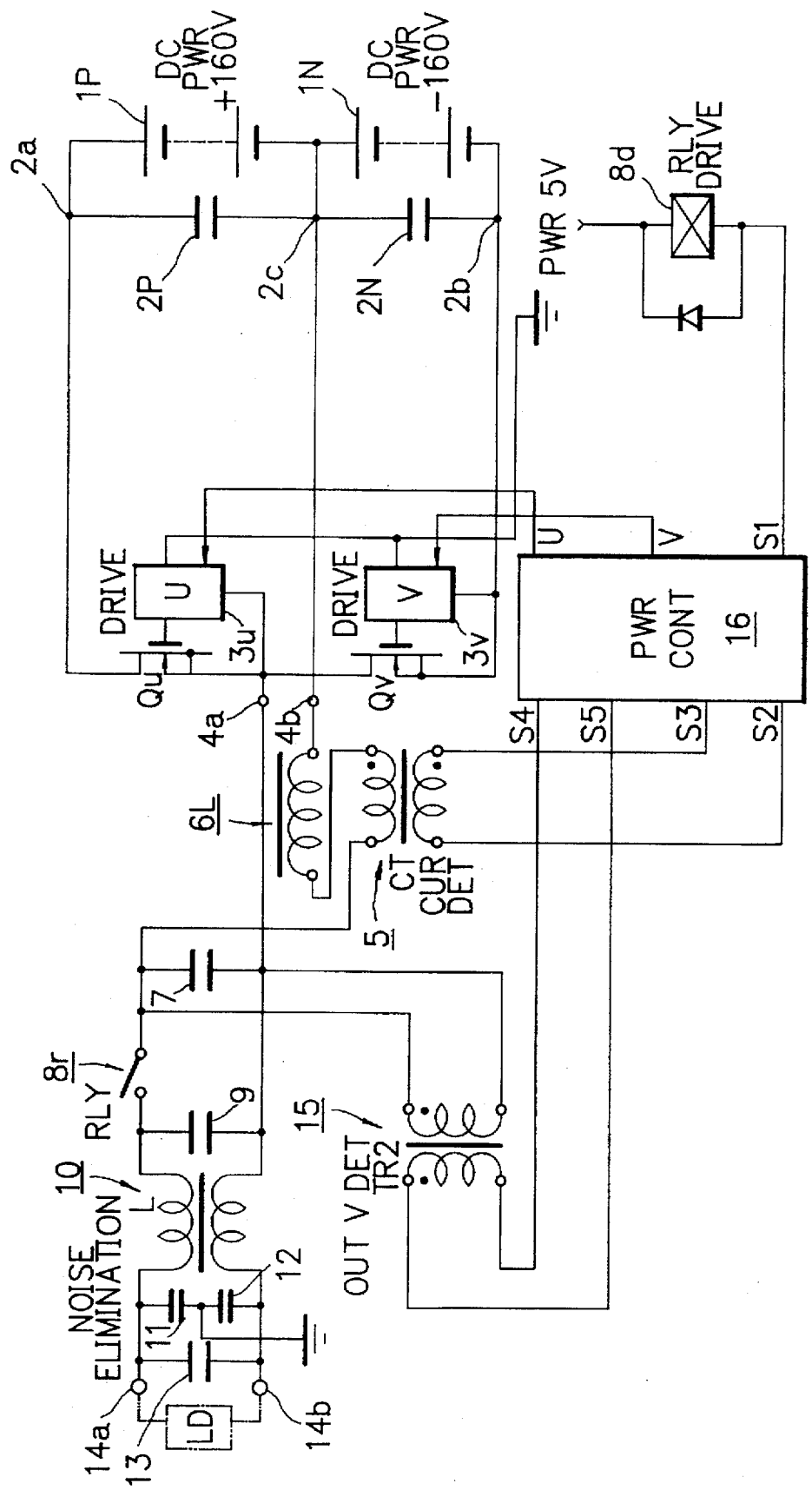
FIG. 22 is a block diagram showing the arrangement of the third embodiment of the present invention.

FIG. 22 shows the arrangement of the third embodiment of the present invention. The switching circuits in the first and second embodiments have full-bridge arrangements. In contrast to this, a switching circuit in the third embodiment has a half-bridge arrangement. Similar to the second embodiment, a reactor 6L is used in place of the step-up transformer 6 (first embodiment). In the third embodiment, a DC power supply 1P applies a voltage of +160 V to a DC input terminal 2a, and another DC power supply 1N applies a voltage of −160 V to a DC input terminal 2b. The voltage between the DC input terminals 2a and 2b is 320 V. One AC voltage output terminal 4b may be connected to an intermediate potential terminal (a terminal of the DC power supply at which a reference potential of 0 V is set) 2c, and the reactor 6L maybe connected to the terminal 4b. Note that the reactor 6L may be replaced with the step-up transformer 6, and the voltage of each DC power supply may be set to 48 V. In the third embodiment as well, the reactor 6L and a capacitor 7 constitute an LC low-pass filter circuit for generating a 50-Hz alternating current. Furthermore, the hardware arrangement and control operation of a power control circuit 16 in the third embodiment are the same as those in the first embodiment.

What is claimed is:

1. An AC output control apparatus for controlling an AC output supplied to a load on the basis of waveform data read out from an AC waveform memory, comprising:

instantaneous value detection means for detecting an instantaneous value of a voltage or current supplied to the load;

mean value detection means for adding up an instantaneous value of the voltage or current supplied to the load in each specific phase interval, and calculating a mean AC value;

first control means for generating first control data on the basis of a difference between an instantaneous value of the voltage or current and waveform data from said AC waveform memory;

second control means for comparing the mean AC value with a predetermined target control value, and multiplying an amplitude value of the waveform data from said waveform memory by a coefficient value which is increased/decreased in accordance with a relationship in magnitude between the compared values, thereby generating second control data; and AC generation means, controlled by the first and second control data, for generating an output whose current or voltage is controlled with respect to the target control value.

2. An AC output control apparatus for controlling an AC output supplied to a load on the basis of waveform data read out from an AC waveform memory, comprising:

instantaneous value detection means for detecting an instantaneous value of a voltage supplied to the load;

mean value detection means for adding up an instantaneous value of the voltage supplied to the load in each specific phase interval, and calculating a mean AC voltage value;

first control means for generating first control data on the basis of a difference between an instantaneous value of the voltage and waveform data from said AC waveform memory;

second control means for comparing the mean voltage value with a predetermined target voltage value, and multiplying an amplitude value of the waveform data from said waveform memory by a coefficient value which is increased/decreased in accordance with a relationship in magnitude between the compared values, thereby generating second control data; and AC generation means, controlled by the first and second control data, for generating an output whose voltage is controlled with respect to the target voltage value.

3. An AC output control apparatus for controlling an AC output supplied to a load on the basis of waveform data read out from an AC waveform memory, comprising:

instantaneous value detection means for detecting instantaneous values of a voltage and a current supplied to the load;

mean value detection means for adding up an instantaneous value of the current supplied to the load in each specific phase interval, and calculating a mean AC current value;

amplitude adjustment means for comparing the mean current value with a predetermined target current value, and multiplying an amplitude value of the waveform data from said waveform memory by a coefficient value which is increased/decreased in accordance with a relationship in magnitude between the compared values;

control means for generating control data on the basis of a difference between the instantaneous value of the voltage and the waveform data having undergone amplitude adjustment supplied from said amplitude adjustment means; and AC generation means, controlled by the control data, for generating an output whose current is controlled with respect to the target current value.

4. An AC output control apparatus for controlling an AC output supplied to a load on the basis of waveform data read out from an AC waveform memory, comprising:

instantaneous value detection means for detecting an instantaneous value of a voltage supplied to the load;

mean value detection means for adding up an instantaneous value of the voltage supplied to the load in each specific phase interval, and calculating a mean AC voltage value;

amplitude adjustment means for comparing the mean voltage value with a predetermined target voltage value, and multiplying an amplitude value of the waveform data from said waveform memory by a coefficient value which is increased/decreased in accordance with a relationship in magnitude between the compared values;

control means for generating control data on the basis of a difference between the instantaneous value of the voltage and the waveform data having undergone amplitude adjustment supplied from said amplitude adjustment means; and AC generation means, controlled by the control data, for generating an output whose voltage is controlled with respect to the target voltage value.

5. An AC output control apparatus for controlling an AC output supplied to a load on the basis of waveform data read out from an AC waveform memory, comprising:

instantaneous value detection means for detecting instantaneous values of a voltage and a current supplied to the load;

mean value detection means for adding up instantaneous values of the voltage and the current supplied to the load in each specific phase interval, and calculating mean AC voltage and current values;

amplitude adjustment means for comparing the mean voltage value with a predetermined target voltage value, and multiplying an amplitude value of the waveform data from said waveform memory by a coefficient value which is increased/decreased in accordance with a relationship in magnitude between the compared values;

target value adjustment means for comparing the mean current value with a predetermined target current value, and increasing/decreasing the target voltage value in accordance with a relationship in magnitude between the compared values;

control means for generating control data on the basis of a difference between the instantaneous value of the voltage and the waveform data having undergone amplitude adjustment supplied from said amplitude adjustment means; and AC generation means, controlled by the control data, for generating an output whose voltage is controlled with respect to the target voltage value.

6. An AC output control apparatus for controlling an AC output supplied to a load on the basis of waveform data read out from an AC waveform memory, comprising:

instantaneous value detection means for detecting instantaneous values of a voltage and a current supplied to the load;

mean value detection means for adding up instantaneous values of the voltage and the current supplied to the load in each specific phase interval, and calculating mean AC voltage and mean current values;

first control data generation means for comparing the mean current value with a predetermined target current value, and multiplying an amplitude value of the waveform data from said waveform memory by a coefficient value which is increased/decreased in accordance with a relationship in magnitude between the compared values, thereby generating first control data;

second control data generation means for comparing the mean voltage value with a predetermined target voltage value, and multiplying an amplitude value of the waveform data from said waveform memory by a coefficient value which is increased/decreased in accordance with a relationship in magnitude between the compared values, thereby generating second control data;

target value adjustment means for comparing the mean current value with the predetermined target current value, and increasing/decreasing the target voltage value in accordance with a relationship in magnitude between the compared values;

third control data generation means for generating third control data by adding a difference between the instantaneous value of the voltage and one of the first or second control data to the other control data; and AC generation means, controlled by the third control data, for generating an output whose current and voltage are controlled with respect to the respective target values.

7. The apparatus according to claim 6, wherein said third control data generation means is means for generating a difference between a sum of the first and second control data and the instantaneous value of the voltage.

8. The apparatus according to claim 6, wherein said third control data generation means is means for generating the third control data by multiplying a difference between the first control data and the instantaneous value of the voltage by a predetermined gain, and adding the second control data to the product.

9. The apparatus according to claim 6, wherein said first control data generation means comprises limit means for limiting an increase/decrease in the coefficient value for the first control data between predetermined upper and lower limits.

10. The apparatus according to claim 6, wherein said target value adjustment means comprises arithmetic means for decreasing the target voltage value by a small value when the mean current value is larger than the target current value, and increasing the target voltage value by a small value when the mean current value is smaller than the target current value, and limit means for limiting an output from said arithmetic means between predetermined upper and lower limits, the upper limit being set to a constant value that applies a rated output voltage to the load when an output voltage from said AC generation means coincides with the target voltage value.

11. The apparatus according to claim 10, further comprising integration means for detecting a DC component of an AC output by adding up the mean current or voltage value in each AC half cycle in consideration of a polarity therein, adjustment means for comparing an output from said integration means with a predetermined range, increasing/decreasing DC adjustment data by a small amount when the output falls outside the range depending on whether the output is above or below the range and holding previous value of the DC adjustment data when the output falls within the range, and DC shift means for adding the DC adjustment data to the second control data, wherein a DC compensation loop operation is performed such that the DC component of the output from said AC generation means becomes a value within the range and decreases to an amount which can be substantially neglected with respect to an AC component.

12. The apparatus according to claim 11, further comprising count means for detecting convergence of a compensation loop by counting a comparison result indicating that an output from said arithmetic means falls within the range by the number of times not less than a predetermined number of times a loop operation is performed, and switch means which is closed in response to a convergence detection output from said count means to supply an output from said AC generation means to the load.

13. The apparatus according to claim 11, wherein said DC shift means for adding the DC adjustment data to the second control data comprises first addition means for adding an upper bit group of the DC adjustment data to the second control data, memory means from which fine adjustment data having "1" s corresponding in number to a value represented by the lower bit group is read out by using a lower bit group of the DC adjustment data as an address, serial shift means for serially shifting the fine adjustment data in units of bits for every DC compensation loop, and second addition means for adding a "1" output from said serial shift means to an output from said first addition means.

14. The apparatus according claim 1, wherein said AC generation means comprises

PWM means for generating a PWM pulse whose duty changes with time in accordance with an amplitude value of input control data, and an inverter bridge switch which is switched in accordance with an output pulse from said PWM means to convert a DC input into an AC output.

* * * * *